United States Patent
Miyazoe et al.

(10) Patent No.: US 7,863,215 B2
(45) Date of Patent: Jan. 4, 2011

(54) PHOTOCATALYST, METHOD FOR PRODUCING SAME, LIQUID DISPERSION CONTAINING PHOTOCATALYST AND PHOTOCATALYST COATING COMPOSITION

(75) Inventors: Satoru Miyazoe, Ichihara (JP); Takashi Nabeta, Chiba (JP); Nobuhiko Horiuchi, Chiba (JP)

(73) Assignee: Mitsui Chemicals, Inc., Minato-Ku, Tokyo (JP)

( * ) Notice: Subject to any disclaimer, the term of this patent is extended or adjusted under 35 U.S.C. 154(b) by 688 days.

(21) Appl. No.: 11/884,049

(22) PCT Filed: Feb. 14, 2006

(86) PCT No.: PCT/JP2006/302542
§ 371 (c)(1),
(2), (4) Date: Aug. 9, 2007

(87) PCT Pub. No.: WO2006/088022
PCT Pub. Date: Aug. 24, 2006

(65) Prior Publication Data
US 2009/0124490 A1 May 14, 2009

(30) Foreign Application Priority Data
Feb. 15, 2005 (JP) ............................. 2005-037763

(51) Int. Cl.
*B01J 33/00* (2006.01)
*B01J 21/06* (2006.01)
*B01J 21/08* (2006.01)
*C01G 23/047* (2006.01)
*C04B 28/26* (2006.01)

(52) U.S. Cl. ............... 502/232; 502/239; 502/350; 423/608; 423/610; 106/287.34; 427/162; 427/213.3; 427/215; 427/219

(58) Field of Classification Search ............... 502/4, 502/350, 440; 423/608, 610; 204/192.1, 204/192.12; 106/287.34; 427/162, 213.3
See application file for complete search history.

(56) References Cited

U.S. PATENT DOCUMENTS 2,885,366 A    5/1959   Iler et al.

(Continued)

FOREIGN PATENT DOCUMENTS

EP    1074525    *    2/2001

(Continued)

OTHER PUBLICATIONS

Yu-Lan Lin, Ting-Jie Wang), Yong Jin, "Surface characteristics of hydrous silica-coated TiO particles," Powder Technology 123 (2002), pp. 194-198.*

(Continued)

*Primary Examiner*—Emily M Le
*Assistant Examiner*—Diana J Liao
(74) *Attorney, Agent, or Firm*—Buchanan Ingersoll & Rooney PC

(57) ABSTRACT

Disclosed is a photocatalyst comprising a photocatalytically active base, and a silicon oxide film covering the base and substantially having no pores. The alkali metal content of the photocatalyst is not less than 1 ppm but not more than 1,000 ppm. Also disclosed is a method for producing such a photocatalyst wherein when a photocatalytically active base present in an aqueous medium is coated with a silicon oxide film by using a silicate, the pH of the aqueous medium containing both the photocatalytically active base and the silicate is maintained at 5 or below.

32 Claims, 3 Drawing Sheets

U.S. PATENT DOCUMENTS

| | | | |
|---|---|---|---|
| 4,075,031 A | * | 2/1978 | Allen .......................... 106/446 |
| 6,217,999 B1 | * | 4/2001 | Zhang et al. ............. 428/312.6 |
| 6,534,044 B1 | * | 3/2003 | Wada et al. ................... 424/59 |

FOREIGN PATENT DOCUMENTS

| | | |
|---|---|---|
| JP | 62-260717 A | 11/1987 |
| JP | 08-132075 A | 5/1996 |
| JP | 09-276706 A | 10/1997 |
| JP | 10-130527 A | 5/1998 |
| JP | 10-180115 A | 7/1998 |
| JP | 11-240719 A | 9/1999 |
| JP | 2002-159865 A | 6/2002 |
| JP | 2002-200148 A | 7/2002 |
| JP | 2004-161592 A | 6/2004 |
| JP | 2004-300423 A | 10/2004 |
| JP | 2005-281557 A | 10/2005 |
| WO | WO 93/22386 A1 | 11/1993 |
| WO | WO 03/068871 A1 | 8/2003 |

OTHER PUBLICATIONS

Muhammad Shariq Vohra, Keiichi Tanaka, "Photocatalytic degradation of aqueous pollutants using silica-modified TiO2," Water Research 37 (2003), pp. 3992-3996.*

S. H. Ehrman, S. K. Friedlander and M. R. Zachariah, "Characteristics of SiO2 /TiO2 Nanocomposite Particles Formed in a Premixed Flat Flame," J. Aerosol Sci. vol. 29, No. 5/6 (1998) pp. 687-706.*

Q.H. Powell, G.P. Fotou, T.T. Kodas, B.M. Anderson, Y-X. Guo, "Gas-phase coating of TiO2 with SiO2 in a continuous flow hot-wall aerosol reactor," J Mater. Res., vol. 12 No. 2 (Feb. 1997), pp. 552-559.*

Hirano et al., "Direct Formation of Anatase ($TiO_2$)/Silica ($SiO_2$) Composite Nanoparticles with High Phase Stability of 1300° C. from Acidic Solution by Hydrolysis under Hydrothermal Condition", Chemistry of Materials, Sep. 21, 2004, pp. 3725-3732, vol. 16-No. 19, American Chemical Society.

* cited by examiner (A)

(B)

US 7,863,215 B2

PHOTOCATALYST, METHOD FOR PRODUCING SAME, LIQUID DISPERSION CONTAINING PHOTOCATALYST AND PHOTOCATALYST COATING COMPOSITION

TECHNICAL FIELD

The present invention relates to a photocatalyst which is excellent in the photodegradation activity of an organic substance, a photocatalyst liquid dispersion and a photocatalyst coating composition containing such a photocatalyst, and a method for producing a photocatalyst comprising a photocatalytically active base and a silicon oxide film covering the base by using a silicate.

BACKGROUND ART

A metal oxide semiconductor such as titanium dioxide, zinc oxide and the like exhibits a property of absorbing light having an energy corresponding to its band gap. In recent years, such a metal oxide semiconductor has been paid attention to because of its high responsiveness due to holes and electrons generated by excitation caused by light irradiation so that there has been attempted to use such a semiconductor as a "photocatalyst" for its application to the remediation of the environment such as the purification of water, the prevention of pollution, sterilization, deodorization, the purification of atmosphere and the like. Of known photocatalysts, a commercial photocatalyst P25 (a product of Nippon Aerosil Co., Ltd.) or ST-01 (a product of Ishihara Sangyo Kaisha, Ltd.) that is titanium oxide has been widely used. However, the photodegradation activity is not sufficient in these photocatalysts. In particular, in order to utilize photocatalytic functions in an environment with the weak ultraviolet intensity such as indoors, a catalyst further excellent in the photodegradation activity has been demanded to be developed.

As a technique for improving the photodegradation activity, there have been widely known a technique for improving the shape of the photocatalyst represented by a particle diameter, a film thickness, a surface area, a pore diameter and the like, and a technique for adding a co-catalyst, a sensitizer and the like. Further, there has been also proposed a photocatalyst composited with a compound having other functions, while there has been known a photocatalyst composited with silica, aluminum oxide, zirconium dioxide, silica-alumina, zeolite and the like.

As a photocatalyst containing silicon oxide, there have been disclosed a photocatalyst particle with titanium dioxide coated with a porous silica film (refer to Patent Document 1) and a photonic semiconductor with a silica-based film loaded thereinto (refer to Patent Document 2). Of these two patents, in Patent Document 1, there have been disclosed that by compositing with a porous silica film, when a photocatalyst was added to the organic fiber, resin or the like by mixing or the like, an effect which hardly deteriorates an organic fiber, resin or the like could be provided and the photodegradation activity was equivalent to that of uncoated photocatalyst. In Patent Document 2, there have been disclosed that a silica-based film was formed by supplying an organohydrogen polysiloxane to a photocatalyst in gas phase and the fungicidal activity in light irradiation conditions was enhanced higher than the original activity of the photocatalyst even though the photocatalyst was coated.

As a production method for coating a photocatalyst with a silicon oxide film, there have been disclosed a method for coating the photocatalyst in a neutral organic medium by using alkoxysilane (refer to Patent Document 3), a method for coating it by partially neutralizing a silicate to weak basic region (refer to Patent Document 4), a method for coating it in an acidic or basic water-alcohol mixed medium by using alkoxysilane (refer to Patent Document 5) and a method for coating it by simultaneously adding a silicate and a mineral acid to a titania liquid dispersion, and maintaining the pH at 7 to 11 (refer to Patent Document 6).

There has been known a way of improving the photodegradation activity by making a composite of silicon oxide with a photocatalyst. There has been known an anatase titanium-silica composite subjected to a heating treatment of a co-precipitate generated by a hydrothermal reaction of an aqueous solution containing a sulfate of titanium and alkoxysilane.

There has been disclosed that the anatase titanium-silica composite exhibited the photodegradation activity over twice as high as a commercial photocatalyst ST-01 (refer to Patent Document 7 and Non-patent Document 1).

Patent Document 1: Japanese Patent Laid-open No. 1998-276706
Patent Document 2: Japanese Patent Laid-open No. 1987-260717
Patent Document 3: Japanese Patent Laid-open No. 2000-240719
Patent Document 4: U.S. Pat. No. 2,885,366
Patent Document 5: Japanese Patent Laid-open No. 1998-180115
Patent Document 6: WO 1993/022386
Patent Document 7: Japanese Patent Laid-open No. 2004-161592
Non-Patent Document 1: M. Hirano, et al., Chem. Mater: 2004, 16, 3725-3732

DISCLOSURE OF THE INVENTION

All photocatalysts coated and/or composited with known silicon oxide have only the photodegradation activity equal to or less than that of a commercial photocatalyst, P25 and/or ST-01 of titanium oxide, so that a desired highly active photocatalyst has not been achieved. For example, in Patent Document 6, there has been disclosed that the activity became twice and more, but it was lower than that of the commercial photocatalyst P25 as a result of comparison by an additional test.

An object of the present invention is to provide a photocatalyst of a structure coated with a silicon oxide film which has the photodegradation activity superior to that of the commercial photocatalyst that is titanium oxide.

In order to solve the above problems, the present inventors have conducted an extensive study and as a result, have found that when a commercial photocatalyst, P25 and/or ST-01 of titanium oxide, is present in an acidic aqueous solution, and an aqueous solution of sodium silicate is introduced in order to maintain the pH at 5 or below, a surface of the photocatalyst becomes a condensation catalyst of the silicate compound so that silicon oxide is quickly generated only on the surface of the photocatalyst. They have found that when the thus-obtained silicon oxide coated photocatalyst is introduced into a solution of methylene blue in general as a test target of the photodegradation activity and irradiated with light, the photodegradation activity of the photocatalyst is superior to that of the commercial photocatalyst, P25 and/or ST-01 of titanium oxide. Thus, the present invention has been completed.

That is, according to the present invention, there is provided with a photocatalyst comprising a photocatalytically active base, and a silicon oxide film covering the base and substantially having no pores, wherein the alkali metal content of the photocatalyst is not less than 1 ppm but not more than 1,000 ppm.

Further, according to the present invention, there is provided with a method for producing a photocatalyst comprising a photocatalytically active base, and a silicon oxide film covering the base and substantially having no pores, including the following steps (A) and (B):

(A) a step of mixing at least any one set of an aqueous medium containing the base and a silicate, an aqueous medium containing a silicate and the base, and an aqueous medium containing the base and an aqueous medium containing a silicate, and then covering the base with the silicon oxide film; and (B) a step of separating the silicon oxide film and the photocatalyst having the base covered with the silicon oxide film from the aqueous medium, in which the pH of the mixed solution containing both the base and the silicate in step (A) is maintained at 5 or below.

As described above, the photocatalyst according to the present invention has a structure including a photocatalytically active base and a silicon oxide film covering the base. Herein, the "photocatalytically active base" refers to an uncoated photocatalyst. The shape of the photocatalyst is not particularly limited, while a photocatalyst in the shape of particles, a mold, a fiber, a coating film and the like can be used.

In this specification, a term of the "photocatalyst" is used as a concept including any of an uncoated photocatalyst and a photocatalyst of a structure coated with a silicon oxide film. Specifically, a term of the "photocatalyst" includes any of titanium oxide that is a commercial photocatalyst and a photocatalyst with the titanium oxide coated with a silicon oxide film. Furthermore, a photocatalyst having a silicon oxide film is properly called a "silicon oxide coated photocatalyst."

According to the present invention, it is possible to provide a silicon oxide coated photocatalyst having the photodegradation activity which is remarkably higher than that of the commercial photocatalyst of titanium oxide. Further, according to the present invention, it is possible to provide a method for simply and economically producing such a silicon oxide coated photocatalyst.

Since the photocatalyst coated with a silicon oxide film of the present invention has high photodegradation activity, it can be used for a photocatalyst coating, a photocatalyst coating film, a photocatalyst mold, a photocatalyst-containing resin mold and the like which are excellent in the photodegradation activity as compared to the conventional photocatalysts. And, it is possible to enlarge the applications of the photocatalyst even to a place where sufficient photodegradation activity cannot be expected with the conventional photocatalysts because of poor light intensity, such as a plane of building outer wall avoiding direct sunlight, indoors or the like. Further, when it is applied to purifying facilities, since it has high photodegradation activity, enhanced processing capability or compact devices can be realized.

BRIEF DESCRIPTION OF THE DRAWINGS

The aforementioned objects and other objects, characteristics and advantages become further clear by the appropriate embodiments to be described below and the following drawings accompanied thereto.

BEST MODE FOR CARRYING OUT THE INVENTION

Figure 1:
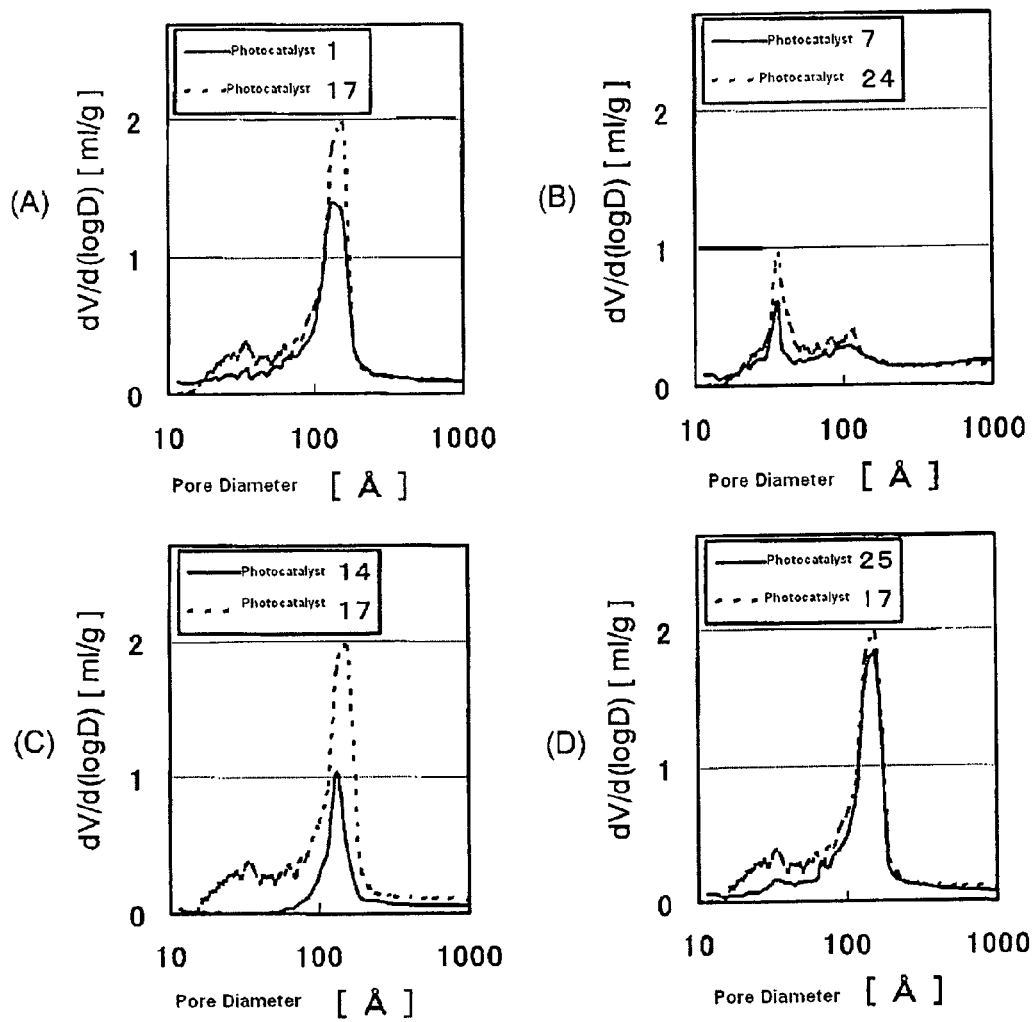
FIG. 1 (A) to (D) illustrate each a log differential pore volume distribution curve (a solid line) of a photocatalyst having a silicon oxide film and a log differential pore volume distribution curve (a dotted line) of a photocatalyst without having a silicon oxide film corresponding to a base of the photocatalyst.

The silicon oxide coated photocatalyst according to the present invention includes a photocatalytically active base, and a silicon oxide film covering the base and substantially having no pores, and the alkali metal content of the photocatalyst is not less than 1 ppm but not more than 1,000 ppm.

The silicon oxide coated photocatalyst refers to a photocatalyst having a surface of the photocatalytically active base coated with a film made of silicon oxide. Accordingly, the silicon oxide coated photocatalyst does not include a photocatalyst fixed to silicon oxide to be produced by forming a photocatalyst later in the presence of silicon oxide, and does not include a composite formed by combining silicon oxide and a photocatalyst in the same vessel.

The type of coating a base with a silicon oxide film is not particularly limited, and includes any of a type of coating a part of the base and a type of coating the whole base. But, from a viewpoint of achieving much higher photodegradation activity, the whole surface of the base is preferably coated with a film made of silicon oxide all at once.

A metal-compound photonic semiconductor can be used as the photocatalytically active base (hereinafter, properly referred to as a "base"). Examples of the metal-compound photonic semiconductor include titanium oxide, zinc oxide, tungsten oxide, strontium titanate and the like. Among them, preferred is titanium oxide which is excellent in a photocatalytic ability and stability as well, and which is harmless. Examples of titanium oxide include an amorphous type, an anatase type, a rutile type, a brookite type and the like. Of these, an anatase type, a rutile type or a mixture thereof excellent in the photocatalytic ability is further preferable, and a small amount of an amorphous type may also be contained therein.

As a base, there can also be used a metal-compound photonic semiconductor with one or more transition metals added thereto, a metal-compound semiconductor with one or more of typical elements in group 14, group 15 and/or group 16, a photonic semiconductor including two or more metal compounds, and a mixture of two or more metal-compound semiconductors.

Furthermore, as a base, a particle of the metal-compound photonic semiconductor is preferably used. For example, a mold, a fiber, a coating film and the like with a part of the metal-compound photonic semiconductor surface exposed thereon can also be used. Further, a base preferably contains a metal-compound photonic semiconductor having a specific surface area of not less than 30 $m^2/g$.

Meanwhile, except a case in which a base can be clearly recognized as a particle, the specific surface area of the base fixed to a mold, a fiber, a coating film and the like cannot be provided by the general BET method as a method for measuring a specific surface area. In such a case, based on a primary particle diameter obtained by an X-ray diffraction analysis and the calculation according to Sheller's equation, or the observation of a primary particle using an electron microscope, the "surface area" is calculated through spherical conversion. Further, the specific surface area can be obtained by calculating the "weight" from the true density of the crystal form by finding out the crystal form from the diffraction analysis of X-ray or electron beam and the volume obtained from the above spherical conversion.

In the present invention, examples of the alkali metal include lithium, sodium, potassium, rubidium, cesium and francium. These alkali metals may be contained singly, or two or more kinds thereof may be contained. At least any one of these sodium and potassium is preferable and sodium is more preferable.

The alkali metal content in the photocatalyst can be quantitatively analyzed by using an Atomic Adsorption Spectrophotometer (AA), an Inductively Coupled Plasma Atomic Emission Spectroscopy (ICP), an X-ray Fluorescence Spectrometer (XRF) and the like.

The alkali metal content in the photocatalyst according to the present invention is preferably not less than 1 ppm and more preferably not less than 10 ppm. When it is not less than 1 ppm, an effect on the improvement of the photodegradation activity is achieved. When it is not less than 10 ppm, an effect on the improvement of the photodegradation activity becomes remarkable. The reason why the photodegradation activity is increased by containing a prescribed amount of the alkali metal is not definitely clear, but it is considered so because the absorption rate of the decomposition target is enhanced.

On the other hand, the upper limit of the alkali metal content is preferably not more than 1,000 ppm and more preferably not more than 500 ppm. By having the content of not more than 1,000 ppm, elution of a silicon oxide film can be suppressed. Furthermore, by having the content of not more than 500 ppm, generation of sintering of the photocatalyst in a calcination treatment at a temperature range of exceeding 800 degree centigrade can be suppressed.

"Substantially having no pores" means that there are substantially no pores present in a silicon oxide film when pore size distribution of a photocatalytically active base used as a raw material in the production of the silicon oxide coated photocatalyst is compared with that of a silicon oxide coated photocatalyst prepared by using the photocatalytically active base in the range of 20 to 500 Angstroms.

Specifically, pore size distribution of a photocatalytically active base and that of a silicon oxide coated photocatalyst are found out by the measurement of pore size distribution such as a nitrogen adsorption method or the like, and compared to each other, whereby it is possible to determine whether there are substantially any pores present in a silicon oxide film or not.

To more specifically describe a way of finding the pore size distribution according to the nitrogen adsorption method, it is possible to determine whether there are any pores present in a silicon oxide film according to the following methods (1) to (4). Herein, an example of using a photocatalyst particle as a base will be described below.

(1) a photocatalyst particle is dried at 200 degree centigrade and then an $N_2$ adsorption isotherm in the desorption process is measured;

(2) an $N_2$ adsorption isotherm of the silicon oxide coated photocatalyst in the desorption process is measured;

(3) the aforementioned two $N_2$ adsorption isotherms are interpreted by the BJH (Barrett-Joyner-Halenda) method to obtain a log differential pore volume distribution curve in the range of 20 to 500 Angstroms;

(4) by comparing two log differential pore volume distribution curves, when there is no region in which the log differential pore volume of the silicon oxide coated photocatalyst is not less than 0.1 mg/g greater than the log differential pore volume of the photocatalyst particle, it is determined that there are substantially no pores in a silicon oxide film. On the other hand, when there is a region in which the log differential pore volume of the silicon oxide coated photocatalyst is not less than 0.1 mg/g greater than the log differential pore volume of the photocatalyst particle, it is determined that there are pores present in a silicon oxide film. Moreover, having a range of not less than 0.1 ml/g is because a measurement error of about 0.1 ml/g wide of the log differential pore volume value in the measurement of pore distribution by the nitrogen adsorption method occurs in many cases.

When two log differential pore volume distribution curves are compared in the range of 20 to 500 Angstroms, existence of pores in a silicon oxide film can be substantially determined.

Furthermore, it is more preferable that two log differential pore volume distribution curves are compared and there is no region in which the log differential pore volume of the silicon oxide coated photocatalyst is not less than 0.1 ml/g greater than the log differential pore volume of the photocatalyst particle in the range of 10 to 1,000 Angstroms.

Herein, when there are pores present in the silicon oxide film, it is difficult to improve the photodegradation activity. The reason is not definitely clear, but it is supposedly because the diffusion or reflection of light easily occurs in the silicon oxide film due to existence of the pores for reducing light intensity of ultraviolet rays reaching the photocatalytically active base and reducing the amount of holes and electrons generated by the excitation of the photocatalyst. Further, in case of the same amount of silicon oxide used for coating, it is supposed that the thickness of the silicon oxide film having pores is increased more than that of the silicon oxide film having no pores as much as the volume of pores and as a result, the physical distance between the photocatalytically active base and organic substance of a decomposition target becomes large so that sufficient photodegradation activity is not achieved.

The amount of silicon loaded into the silicon oxide coated photocatalyst per a surface area 1 $m^2$ thereof according to the present invention is a value calculated from the amount of silicon contained in the silicon oxide coated photocatalyst and the surface area of the silicon oxide coated photocatalyst. The amount of silicon loaded into the silicon oxide coated photocatalyst per a surface area 1 $m^2$ thereof is not less than 0.10 mg but not more than 2.0 mg, preferably not less than 0.12 mg but not more than 1.5 mg, and more preferably not less than 0.16 mg but not more than 1.0 mg. When such an amount is less than 0.10 mg, an effect on the improvement of the activity by the silicon oxide film is not sufficient so that an effect on the improvement of the photodegradation activity is small. On the other hand, when the amount exceeds 2.0 mg, the proportion of the base occupied in the silicon oxide coated photocatalyst is too lowered so that the photodegradation activity is hardly improved.

The surface areas of the base and the silicon oxide coated photocatalyst can be measured by using a BET method specific surface area measuring instrument by nitrogen adsorption and desorption after a heating treatment at 150 degree centigrade for 15 minutes in a dry gas flow of not more than −195.8 degree centigrade of a dew point.

The method for producing the silicon oxide coated photocatalyst of the present invention is characterized by maintaining the pH of the mixed solution containing both the base and the silicate at 5 or below when the base present in an aqueous medium is coated with a silicon oxide film by using a silicate.

A conventional method for producing a photocatalyst of a structure coated with a silicon oxide film has the following assignments:

(A) a raw material of the silicon oxide film is expensive;

(B) since alcohol is generated as a by-product at the time of production and/or an organic medium is employed, a highly expensive explosion-proof facility used exclusively is needed;

(C) because of a treatment in gas phase, it is difficult to control the amount of loaded silicon at will, making it difficult to produce the photocatalyst by controlling the amount of loaded silicon stably;

(D) since liquid waste containing dangerous substances such as alcohol and the like is generated, its disposal becomes complicated; and (E) since a silicate compound is coated in the pH range in which it is quickly gelated, a silicon oxide film having pores is formed.

For example, in the production methods of Patent Documents 1, 4 and 6 as described in Background Art items, (A), (B) and (D) are problems, in the production method of Patent Document 2, (A) and (C) are problems, in the production method of Patent Document 3, (A), (B), (D) and/or (E) are problems, and in the production method of Patent Document 5, (E) is a problem.

On the other hand, in the production method according to the present invention, since a silicate is used as a raw material, not only a cheap raw material can be used as a raw material of the silicon oxide film but also alcohol is never generated as a by-product at a time of production. Furthermore, when water is only used as an aqueous medium, since an organic medium, alcohol or the like is not employed, a highly expensive explosion-proof facility used exclusively is not necessary and disposal of liquid waste is not complicated at the same time.

Meanwhile, since a treatment in liquid phase is enabled, the amount of loaded silicon is relatively easily controlled at will. Further, when the base is coated with a silicon oxide film, since the pH of the mixed solution containing both the base and the silicate is 5 or below, a solution containing a silicate compound can be stably present and silicon oxide substantially having no pores can be formed on the surface of the base.

Examples of the aqueous medium in the above production method include water or a mixed solution containing water as a main component and an organic solvent capable of being dissolved in water such as aliphatic alcohols, aliphatic esters and the like. Concrete examples of the aqueous medium include water, and a mixed solution of water and methyl alcohol, water and ethyl alcohol, water and isopropanol, and the like. Of these, water is preferable. Further, these water and mixed solutions can be used singly or in combination of two or more kinds. In the aqueous medium, in order to enhance the dispersibility or solubility of the base, an organic solvent capable of being dissolved in water such as aliphatic alcohols, aliphatic esters and the like, a surfactant such as aliphatic amines, aliphatic polyethers, gelatins and the like can also be further mixed.

As a silicate, a salt of a silicic acid and/or an oligomer thereof is used and it may also be used in combination of two or more kinds. Sodium salts and potassium salts are preferable from the viewpoint that they can be industrially available, while an aqueous solution of sodium silicate (JIS K1408 "water glass") is more preferable since a dissolving step can be omitted.

When a base present in an aqueous medium is coated with a silicon oxide film by using a silicate, the aqueous medium, base and silicate are mixed, and the mixed solution is subsequently aged.

Specifically, a coating method includes a step of mixing at least any one set of (i) an aqueous medium containing a base and a silicate, (ii) an aqueous medium containing a silicate and a base, and (iii) an aqueous medium containing a base and an aqueous medium containing a silicate, and a step of aging the mixed solution. In a step of aging, coating of the base with a silicon oxide film is slowly progressed.

At this time, it is necessary to maintain the pH of the aqueous medium containing both the base and the silicate at 5 or below, and the pH is further preferably in acidic regions of not more than 4. When the pH is maintained at 5 or below in the absence of a base, a condensate of a silicate compound is hardly precipitated singly from a silicic acid, a silicate ion and/or an oligomer thereof. On the other hand, when the pH is maintained at 5 or below in the presence of a base, the surface of the base functions as a condensation catalyst of a silicate compound and a silicon oxide film is quickly generated only on the surface of the base. Namely, the acidic range of pH 5 or below enables to make a solution containing a silicate compound stable and is a range capable of forming silicon oxide in the form of a film on the surface of the base.

In the basic range of pH 11 or more, when a solution containing a silicic acid, a silicate ion and/or an oligomer thereof is aged similarly to the acidic range of pH 5 or below, a condensate of a silicate compound is hardly precipitated. However, since a silicon oxide film is formed from only a part of the silicate in use, it is not preferable. Furthermore, since the pH range of 6 to 11 easily generates a condensate of a silicate compound, that is, a fine silicon oxide particle and/or gel, the silicon oxide film becomes porous or silicon oxide is partially formed on the surface of the base so that it is not preferable.

When an organic medium such as alcohol or the like is present in an aqueous medium, since the pH cannot be accurately measured with water pH electrodes, it can be measured by using pH electrodes for an aqueous solution containing an organic medium. Separately, it is also possible to measure the pH by substituting the organic medium with water of the same volume.

As a method for maintaining the pH of the mixed solution containing both the base and the silicate at 5 or below, when the base, silicate, aqueous solvent are mixed and aged, a method in which the pH of the aqueous medium is always measured and properly adjusted by adding an acid and a base may be good. However, it is convenient if the total weight of the basic component contained in the silicate used in the production is neutralized and then an acid in an amount sufficient for the pH of 5 or below is present in the aqueous medium in advance.

Any acid can be used for an acid, but a mineral acid is properly used. Acids may be used singly or in combination of two or more kinds. A base (chemistry) is not particularly needed to use separately when the above method is employed such that the total weight of the basic component contained in the silicate is neutralized and then an acid in an amount sufficient for the pH of 5 or below is present in the aqueous medium in advance. However, when a base (chemistry) is used, any base can be used. Of such bases, alkali metal hydroxides such as potassium hydroxide, sodium hydroxide and the like are properly used.

The reaction conditions such as the reaction temperature, reaction time and the like while aging the mixed solution and coating the base with a silicon oxide film are not particularly restricted as far as generation of the desired silicon oxide coated photocatalyst is not adversely affected. The reaction temperature is preferably not less than 10 degree centigrade but not more than 200 degree centigrade and more preferably not less than 20 degree centigrade but not more than 80 degree centigrade.

When it is less than 10 degree centigrade, it becomes difficult to progress condensation of a silicate compound, whereby generation of a silicon oxide film is remarkably delayed and the deteriorated productivity of the silicon oxide coated photocatalyst might be brought about in some cases.

If the temperature is higher than 200 degree centigrade, a condensate of a silicate compound, that is, a fine silicon oxide particle and/or gel is easily generated so that the silicon oxide film becomes porous or silicon oxide is partially formed on the surface of the base in some cases.

The time to age is preferably not less than 10 minutes but not more than 500 hours, and more preferably not less than 1 hour but not more than 100 hours. When it is less than 10 minutes, coating with the silicon oxide film is not fully progressed so that an effect on the improvement of the photodegradation activity due to a coating film might not be sufficiently achieved in some cases. When it takes longer than 500 hours, the photocatalytically active base is sufficiently coated with the silicon oxide film and also enhances the photodegradation activity, but the productivity of the silicon oxide coated photocatalyst might be deteriorated in some cases.

Meanwhile, the concentration of the photocatalytically active base contained in the mixed solution is preferably not less than 1 weight % but not more than 50 weight % and more preferably not less than 5 weight % but not more than 30 weight %. When it is less than 1 weight %, the productivity of the silicon oxide coated photocatalyst might be worsened. When it is higher than 50 weight %, coating of the base with the silicon oxide film is not uniformly progressed so that an effect on the improvement of the photodegradation activity might not be sufficiently achieved in some cases. The concentration of silicon contained in the mixed solution is preferably not less than 0.05 weight % but not more than 5 weight % and more preferably not less than 0.1 weight % but not more than 3 weight %. When the silicon concentration is less than 0.05 weight %, condensation of a silicate compound is delayed so that coating of the base with a silicon oxide film might not be sufficient in some cases. When the silicon concentration is higher than 5 weight %, coating of the base with a silicon oxide film might not be uniformly progressed in some cases.

In the production method of the present invention, the proportion of the amount of the photocatalytically active base and the silicate used is preferably not less than 0.01 mg/m$^2$ but not more than 0.50 mg/m$^2$ as a silicon atom per a surface area 1 m$^2$ of the above base. When this proportion is used for the production, in a step of forming a silicon oxide film on the surface of the base, namely, a step of mixing and aging at least any one set of an aqueous medium containing the above base and a silicate, an aqueous medium containing a silicate and the base, and an aqueous medium containing the base and an aqueous medium containing a silicate, the desired silicon oxide film can be formed on the surface of the base, and the amount of a silicic acid, a silicate ion, and/or an oligomer thereof which is/are not condensed on the surface of the base and remained unreacted can be suppressed to small so that a silicon oxide film having pores might be hardly formed in some cases. In the range of not less than 0.50 mg/m$^2$ but not more than 5.0 mg/m$^2$, the proportion becomes greater, the amount of the unreacted product is increased for forming a silicon oxide film having pores in some cases, but generation of pores caused by condensation of the unreacted product can be avoided by reducing the treatment time.

A concrete method for producing the silicon oxide coated photocatalyst of the present invention includes, for example, a production method including (step a) a step of mixing at least any one set of an aqueous medium containing a base and a silicate, an aqueous medium containing a silicate and a base, and an aqueous medium containing a base and an aqueous medium containing a silicate, (step b) a step of aging the mixed solution and coating the base with a silicon oxide film, (step c) a step of separating a silicon oxide coated photocatalyst from an aqueous medium and washing without neutralizing the mixed solution, and (step d) a step of drying and/or calcining the silicon oxide coated photocatalyst, in which, in steps (a) and (b), the pH of the aqueous medium containing both the base and the silicate is maintained at 5 or below.

When separating the silicon oxide coated photocatalyst from the aqueous medium, neutralization causes problems such that an efficiency of the reduction in the alkali metal portion in a washing step becomes worsened and a silicon compound remained as dissolved in the aqueous medium is condensed and gelated so that a porous silica film is formed. The silicate solution is dealkalized in advance and the dealkalized solution is prepared, and the proportion of the amount of the photocatalytically active base and the silicate used is made smaller, whereby the above problems can also be avoided or minimized. However, when the silicon oxide coated photocatalyst is separated from the aqueous medium without being neutralized, the above problems can be avoided. So, it is preferable because the production method is simplified.

A method for separating the silicon oxide coated photocatalyst from the mixed solution is not particularly limited, but known methods, for example, a natural filtering method, a reduced-pressure filtering method, a pressure filtering method, a centrifugal separation method or the like can be properly used.

A method of washing the silicon oxide coated photocatalyst is hot particularly limited. However, for example, repetition of re-dispersing in pure water and filtering desalination washing by ion exchange treatment can be properly used. Further, depending on the applications of the silicon oxide coated photocatalyst, a washing step can also be omitted.

A drying method of the silicon oxide coated photocatalyst is not particularly limited. However, for example, air drying, vacuum drying, heat drying, spray drying or the like can be properly used. Furthermore, depending on the applications of the silicon oxide coated photocatalyst, a drying step can also be omitted.

A calcining method of the silicon oxide coated photocatalyst is not particularly limited. However, for example, reduced-pressure calcining, air calcining, nitrogen calcining or the like can be properly used. Usually, calcination can be carried out at a temperature of not less than 200 degree centigrade but not more than 1,200 degree centigrade, but preferably at a temperature of not less than 400 degree centigrade but not more than 1,000 degree centigrade and more preferably at a temperature of not less than 400 degree centigrade but not more than 800 degree centigrade. When the calcining temperature is less than 200 degree centigrade, a desired silicon oxide film is not generated on the surface of the base so that sufficient photodegradation activity is not achieved. When the calcining temperature is higher than 1,200 degree centigrade, sintering of the silicon oxide coated photocatalyst is progressed so that sufficient photodegradation activity is not achieved. Furthermore, depending on the applications of the silicon oxide coated photocatalyst, a calcining step can also be omitted.

Furthermore, the photocatalyst according to the present invention can also be used in the form of a liquid dispersion and a coating composition as needed. Further, it can also be used as a raw material in a known photocatalyst improvement method in order to achieve high activation, endowment of visible light response, combination with an antibacterial metal compound, endowment of the dispersibility by surface modification, suppression of deterioration of a photocatalyst-containing material caused by making a composite with a compound that is inert as a photocatalyst, or the like. As the above improvement method, there have been known, for example, a method for attempting high activation or endowment of visible light response by loading a platinum compound, a method for improving antibiosis by loading a silver compound or a copper compound, a method for providing the dispersibility into an organic medium by carrying out a surface treatment by an organosilicon compound for modifying the photocatalyst surface to be organophilic medium, and a method for making a composite with hydroxyl apatite.

The photocatalyst liquid dispersion according to the present invention contains the photocatalyst according to the present invention, a liquid medium and a dispersion stabilizer. The liquid dispersion can also be used for porcelain, glass, film, wallpaper, building material, curtain, clothing, tableware and the like as it is, and can also be used as a raw material of a photocatalyst-containing material, a photocatalyst coating composition and the like.

Examples of the liquid medium include water, alcohols such as methyl alcohol, ethyl alcohol and the like, aromatics such as benzene, toluene, xylene and the like, esters such as ethyl acetate and the like, ketones such as acetone and the like. It can be properly used depending on its applications, but from the viewpoint of environmental harmony, water is more preferably used.

As the dispersion stabilizer, an ionic surfactant, a wetting agent, a thickening agent, an acid, a base (chemistry) and the like can be properly used. One of these dispersion stabilizers may be contained or two or more kinds thereof may be contained. As such a surfactant, more preferably used are ionic surfactants such as carboxylic acid salts, sulfonic acid salts, sulfuric acid ester salts, phosphoric acid ester salts, alkylamine salts, quaternary ammonium salts and the like from the viewpoint of the dispersibility.

The concentration of the silicon oxide coated photocatalyst contained in the photocatalyst liquid dispersion is not particularly limited, but it is preferably not less than 2 weight % but not more than 50 weight % and more preferably not less than 5 weight % but not more than 30 weight %. When it is not more than 2 weight %, the concentration of the silicon oxide coated photocatalyst contained in the liquid dispersion is lowered so that the economical efficiency becomes worsened in some cases. When it is not less than 50 weight %, the dispersibility of the silicon oxide coated photocatalyst contained in the liquid dispersion becomes deteriorated in some cases.

The concentration of the dispersion stabilizer contained in the photocatalyst liquid dispersion is not particularly limited, but the total amount of the dispersion stabilizer is preferably not less than 1 weight % but not more than 1,000 weight % and more preferably not less than 2 weight % but not more than 200 weight % based on the silicon oxide coated photocatalyst. When it is not more than 1 weight %, dispersion of the silicon oxide coated photocatalyst by the dispersion stabilizer might not be fully progressed in some cases. If it is not less than 1,000 weight %, an effective component exhibiting a photocatalytic action might be reduced in some cases when the liquid dispersion is actually used.

At the time of dispersion of the photocatalyst according to the present invention, a machine to be used is not particularly limited, but a wet dispersion machine such as a ball mill grinder, a bead mill grinder, an ultrasonic wave grinder, a high pressure wet atomizing apparatus and the like can be properly used. At the time of dispersion, these wet dispersion machines may be used singly or a plurality of machines may be successively used. Furthermore, before dispersion is carried out with a wet grinding machine, coarse grinding may be carried out by using a grinding machine such as a dry grinding machine or the like.

The photocatalyst coating composition of the present invention contains the photocatalyst according to the present invention, a liquid medium and a binder. The photocatalyst coating composition can also be used for the production steps of processed products such as porcelain, flat glass, film, wallpaper, building material, curtain, clothing, tableware and the like, or glass, outer wall and inner wall of a building, or road surface, soundproof wall, tunnel wall, mark, illumination and the like, in addition to the aforementioned articles and the like in ready to use state. When such articles are used by coating, articles may be directly coated or may be coated on one or more intermediate layers to be formed as a coating film in order to improve adhesiveness or protect a base.

Examples of the liquid medium include water, alcohols such as methyl alcohol, ethyl alcohol and the like, aromatics such as benzene, toluene, xylene and the like, esters such as ethyl acetate and the like, ketones such as acetone and the like. Depending on the applications, the liquid mediums can be properly used singly or in combination of two or more kinds. However, from the viewpoint of environmental harmony, as a liquid medium, water is preferably used.

Examples of the binder include colloidal silica, silicone resin, alkoxysilane and partial hydrolysates thereof, a silicon compound such as organoalkoxysilane that is alkoxysilane partially substituted by a hydrocarbon group, a titanium compound such as orthotitanate, titanium peroxide, titanium alkoxide, acetyl acetonate of titanium, sol of titanium oxide and the like, and an organic polymer such as acryl, urethane, fluoric resin and the like. They may be used singly or in combination of two or more kinds. Furthermore, a block polymer, a gradient polymer or the like having two or more partial structures in a molecule can also be used. Of these, a titanium compound, a silicon compound or a fluoric resin is preferable because of its low degradability. In particular, the titanium compound and the silicon compound are preferable since there are little restrictions on a heating treatment after coating. From the viewpoint of environmental harmony, in particular, more preferred are colloidal silica, orthotitanate, titanium peroxide and titanium oxide sol consisting of solely an inorganic substance.

A production method of the photocatalyst coating composition according to the present invention is not particularly limited, and any method may be good as far as it is a wet treatment method exhibiting dispersion or grinding effect. Further, there can also be used a method of mixing constituent components at a time, followed by dispersion and grinding treatment or carrying out dispersion and grinding step by step. A method of mixing a binder to the above photocatalyst liquid dispersion can also be used.

A base material is coated with the photocatalyst coating composition, followed by drying and/or calcining, whereby a composite consisting of the photocatalyst according to the present invention and the base material can be formed. A material, shape, surface structure and the like of the base material are not particularly limited. However, when a binder made of only an inorganic substance is used, since a method for improving the strength of the film by heating is preferable, a base material consisting of an inorganic substance having high heat resistance is suitable. As an inorganic substance having high heat resistance, properly used are glass, metal, ceramic and the like.

EXAMPLES

The present invention is now illustrated in detail below with reference to Examples. However, the present invention is not restricted to these Examples. Furthermore, any of an uncoated photocatalyst and a photocatalyst of a structure coated with a silicon oxide film is hereinafter referred to as a "photocatalyst."

At first, an evaluation method used in Examples is described.

(i) Alkali Metal Content

The sodium content was measured as the alkali metal content. In Examples and Comparative Examples to be described below, an alkali metal other than sodium is not substantially included, but it is below the limit of detection.

The sodium content was quantitatively analyzed by using an atomic adsorption spectrophotometer (Z-5000, Hitachi Ltd.). The limit of detection was 1 ppm. Accordingly, "sodium cannot be detected" refers to the case where sodium is not contained or its content is less than 1 ppm.

(ii) Silicon Content

The silicon content was quantitatively analyzed by using an X-Ray fluorescence spectrometry (LAB CENTER XRE-1700, Shimadzu Corp.).

(iii) Specific Surface Area

The specific surface area was measured by using a BET method specific surface area measuring instrument.

Example 1

To a glass flask were added 200 g of water and 66.9 g of an aqueous solution of 1N hydrochloric acid. 24.5 g of titanium dioxide in the shape of particles (ST-01, Ishihara Sangyo Kaisha, Ltd., anatase type, adsorptive water content: 9 weight %, specific surface area by BET method specific surface area measuring instrument: 300 m$^2$/g) was dispersed therein to give an A solution. To a beaker were added 100 g of water and 10.7 g of an aqueous solution of sodium silicate (SiO$_2$ content: 36.1 weight %, Na$_2$O content: 17.7 weight %, JIS K1408 "Water glass No. 1"), and the resulting material was stirred to give a B solution. The A solution was maintained at 35 degree centigrade and stirred. Thereto was added dropwise the B solution at a rate of 2 ml/min, to obtain a mixed solution C. The pH of the mixed solution C at this time was 2.3. While the mixed solution C was maintained at 35 degree centigrade, it was continuously stirred for 3 days. Then, the mixed solution C was filtered under a reduced pressure. The obtained filter medium was re-dispersed in 500 ml of water and filtered under a reduced pressure repeatedly four times for washing and then allowed to stand at room temperature for 2 days. The obtained solid content was pulverized by using a mortar and then subjected to a calcination treatment at 600 degree centigrade for 3 hours to obtain a photocatalyst 1.

The sodium content of the photocatalyst 1 was 87 ppm. Furthermore, the silicon content of the photocatalyst 1 was 6.9 weight %, while the specific surface area was 212.8 m$^2$/g. Accordingly, the amount of silicon loaded into the photocatalyst 1 per a surface area 1 m$^2$ thereof was 0.33 mg.

Example 2

A photocatalyst 2 was obtained in the same manner as in Example 1, except that the amount of titanium dioxide was 82.1 g and the pH of the mixed solution C was 4.0. The sodium content of the photocatalyst 2 was 56 ppm, the silicon content was 2.4 weight %, and the specific surface area was 133.8 m$^2$/g. Accordingly, the amount of silicon loaded into the photocatalyst 2 per a surface area 1 m$^2$ thereof was 0.18 mg.

Example 3

A photocatalyst 3 was obtained in the same manner as in Example 1, except that the amount of titanium dioxide was 38.9 g and the pH of the mixed solution C was 2.8. The sodium content of the photocatalyst 3 was 85 ppm, the silicon content was 4.6 weight %, and the specific surface area was 194.9 m$^2$/g. Accordingly, the amount of silicon loaded into the photocatalyst 3 per a surface area 1 m$^2$ thereof was 0.24 mg.

Example 4

A photocatalyst 4 was obtained in the same manner as in Example 1, except that the amount of titanium dioxide was 12.2 g and the pH of the mixed solution C was 2.5. The sodium content of the photocatalyst 4 was 160 ppm, the silicon content was 9.6 weight %, and the specific surface area was 244.2 m$^2$/g. Accordingly, the amount of silicon loaded into the photocatalyst 4 per a surface area 1 m thereof was 0.39 mg.

Example 5

A photocatalyst 5 was obtained in the same manner as in Example 1, except that 70.5 g of P25 (Nippon Aerosil Co., Ltd., a mixture having a ratio of anatase to rutile of 8:2, purity: 99.5%, specific surface area by BET method specific surface area measuring instrument: 50 m$^2$/g) was used as titanium dioxide, an aqueous solution of sodium silicate was used in the amount of 6.5 g, and the pH of the mixed solution C was 2.6. The sodium content of the photocatalyst 5 was 34 ppm, the silicon content was 1.4 weight %, and the specific surface area was 61.1 m$^2$/g. Accordingly, the amount of silicon loaded into the photocatalyst 5 per a surface area 1 m$^2$ thereof was 0.22 mg.

Example 6

A photocatalyst 6 was obtained in the same manner as in Example 1, except that 70.5 g of PC-102 (Titan Kogyo Kabushiki Kaisha, anatase type, adsorptive water content: 5%, specific surface area by BET method specific surface area measuring instrument: 137 m$^2$/g) was used as titanium dioxide, the pH of the mixed solution C was 3.8, and the mixed solution C was stirred for 16 hours and aged. The sodium content of the photocatalyst 6 was 12 ppm, the silicon content was 2.2 weight %, and the specific surface area was 127.8 m$^2$/g. Accordingly, the amount of silicon loaded into the photocatalyst 6 per a surface area 1 m$^2$ thereof was 0.18 mg.

Example 7

A photocatalyst 7 was obtained in the same manner as in Example 6, except that 25.0 g of AMT-100 (Tayca Corporation, anatase type, adsorptive water content: 11%, specific surface area by BET method specific surface area measuring instrument: 290 m$^2$/g) was used as titanium dioxide, and the pH of the mixed solution C was 2.4. The sodium content of the photocatalyst 7 was 17 ppm, the silicon content was 5.5 weight %, and the specific surface area was 207.2 m$^2$/g. Accordingly, the amount of silicon loaded into the photocatalyst 7 per a surface area 1 m$^2$ thereof was 0.27 mg.

Example 8

A photocatalyst 8 was obtained in the same manner as in Example 1, except that the mixed solution C was stirred for 16 hours and aged. The sodium content of the photocatalyst 8 was 180 ppm, the silicon content was 5.7 weight %, and the specific surface area was 246.2 m$^2$/g. Accordingly, the amount of silicon loaded into the photocatalyst 8 per a surface area 1 m$^2$ thereof was 0.23 mg.

Example 9

A photocatalyst 9 was obtained in the same manner as in Example 8, except that the resulting filter medium was re-dispersed in 500 ml of water and filtered under a reduced pressure repeatedly 7 times for washing. The sodium content of the photocatalyst 9 was 120 ppm, the silicon content was 5.7 weight %, and the specific surface area was 231.4 m$^2$/g. Accordingly, the amount of silicon loaded into the photocatalyst 9 per a surface area 1 m$^2$ thereof was 0.25 mg.

Example 10

A photocatalyst 10 was obtained in the same manner as in Example 8, except that the resulting filter medium was re-dispersed in 500 ml of water and filtered under a reduced pressure one time for washing. The sodium content of the photocatalyst 10 was 210 ppm, the silicon content was 5.7 weight %, and the specific surface area was 231.4 m$^2$/g. Accordingly, the amount of silicon loaded into the photocatalyst 10 per a surface area 1 m$^2$ thereof was 0.24 mg.

Example 11

A photocatalyst 11 was obtained in the same manner as in Example 1, except that the resulting solid content was subjected to a calcination treatment at 400 degree centigrade for 3 hours. The sodium content of the photocatalyst 11 was 93 ppm, the silicon content was 6.9 weight %, and the specific surface area was 255.5 m$^2$/g. Accordingly, the amount of silicon loaded into the photocatalyst 11 per a surface area 1 m$^2$ thereof was 0.27 mg.

Example 12

A photocatalyst 12 was obtained in the same manner as in Example 1, except that the resulting solid content was subjected to a calcination treatment at 800 degree centigrade for 3 hours. The sodium content of the photocatalyst 12 was 98 ppm, the silicon content was 6.9 weight %, and the specific surface area was 150.7 m$^2$/g. Accordingly, the amount of silicon loaded into the photocatalyst 12 per a surface area 1 m$^2$ thereof was 0.46 mg.

Example 13

A photocatalyst 13 was obtained in the same manner as in Example 1, except that the resulting solid content was subjected to a calcination treatment at 900 degree centigrade for 3 hours. The sodium content of the photocatalyst 13 was 96 ppm, the silicon content was 6.9 weight %, and the specific surface area was 108.2 m$^2$/g. Accordingly, the amount of silicon loaded into the photocatalyst 13 per a surface area 1 m$^2$ thereof was 0.64 mg.

Example 14

A photocatalyst 14 was obtained in the same manner as in Example 1, except that the resulting solid content was subjected to a calcination treatment at 1,000 degree centigrade for 3 hours. The sodium content of the photocatalyst 14 was 92 ppm, the silicon content was 6.9 weight %, and the specific surface area was 55.3 m$^2$/g. Accordingly, the amount of silicon loaded into the photocatalyst 14 per a surface area 1 m$^2$ thereof was 1.25 mg.

Example 15

A photocatalyst 15 was obtained in the same manner as in Example 8, except that an aqueous solution of 1N nitric acid was used instead of an aqueous solution of 1N hydrochloric acid and the pH of the mixed solution C was 3.2. The sodium content of the photocatalyst 15 was 480 ppm, the silicon content was 6.7 weight %, and the specific surface area was 207.4 m$^2$/g. Accordingly, the amount of silicon loaded into the photocatalyst 15 per a surface area 1 m$^2$ thereof was 0.32 mg.

Example 16

A photocatalyst 16 was obtained in the same manner as in Example 8, except that 81.7 g of an aqueous solution of 1N nitric acid was used instead of 66.9 g of an aqueous solution of 1N hydrochloric acid and 13.3 g of an aqueous solution of sodium silicate having a different composition (SiO$_2$ content: 29.1 weight %, Na$_2$O content: 9.5 weight %, JIS K1408 "Water glass No. 3") was used. The sodium content of the photocatalyst 16 was 150 ppm, the silicon content was 3.4 weight %, and the specific surface area was 210.5 m$^2$/g. Accordingly, the amount of silicon loaded into the photocatalyst 16 per a surface area 1 m$^2$ thereof was 0.16 mg.

Comparative Example 1

Titanium dioxide (ST-01, Ishihara Sangyo Kaisha, Ltd., adsorptive water content: 9 weight %, specific surface area: 300 m$^2$/g) was dried in an air at 200 degree centigrade to give a photocatalyst 17. The sodium content of the photocatalyst 17 was 1,400 ppm and the specific surface area was 214.3 m$^2$/g.

Comparative Example 2

A photocatalyst 18 was obtained in the same manner as in Comparative Example 1, except that titanium dioxide was calcined at 600 degree centigrade instead of 200 degree centigrade. The specific surface area of the photocatalyst 18 was 53.5 m$^2$/g.

Comparative Example 3

A photocatalyst 19 was obtained in the same manner as in Comparative Example 1, except that titanium dioxide was calcined at 1,000 degree centigrade instead of 200 degree centigrade. The specific surface area of the photocatalyst 19 was 0.7 m$^2$/g.

Comparative Example 4

Titanium dioxide (P25, Nippon Aerosil Co., Ltd., purity: 99.5%, specific surface area: 50.8 m$^2$/g) was dried in an air at 200 degree centigrade to give a photocatalyst 20. The sodium content of the photocatalyst 20 could not be detected. The specific surface area of the photocatalyst 20 was 50.2 m$^2$/g.

Comparative Example 5

A photocatalyst 21 was obtained in the same manner as in Comparative Example 4, except that titanium dioxide was calcined at 500 degree centigrade instead of 200 degree centigrade. The specific surface area of the photocatalyst 21 was 48.7 m$^2$/g.

Comparative Example 6

A photocatalyst 22 was obtained in the same manner as in Comparative Example 4, except that titanium dioxide was calcined at 1,000 degree centigrade instead of 200 degree centigrade. The specific surface area of the photocatalyst 22 was 1.1 m$^2$/g.

Comparative Example 7

Titanium dioxide (PC-102, Titan Kogyo Kabushiki Kaisha, adsorptive water content: 5%, specific surface area by BET method specific surface area measuring instrument: 137 m$^2$/g) was dried in an air at 200 degree centigrade to give a photocatalyst 23. The sodium content of the photocatalyst 23 was 28 ppm and the specific surface area was 136.3 m$^2$/g.

Comparative Example 8

Titanium dioxide (AMT-100, Tayca Corporation, adsorptive water content: 11%, specific surface area by BET method specific surface area measuring instrument: 290 m$^2$/g) was dried in an air at 200 degree centigrade to give a photocatalyst 24. The sodium content of the photocatalyst 24 was 46 ppm and the specific surface area was 220.2 m$^2$/g.

Comparative Example 9

In accordance with Examples in Japanese Patent Laid-open No. 1987-260717, ST-01 (Ishihara Sangyo Kaisha, Ltd., adsorptive water content: 9 weight %, specific surface area: 300 m$^2$/g) was used as titanium dioxide to obtain a photocatalyst 25. The sodium content of the photocatalyst 25 was 1,200 ppm, the silicon content was 5.8 weight %, and the specific surface area was 187.3 m$^2$/g. Accordingly, the amount of silicon loaded into the photocatalyst 25 per a surface area 1 m$^2$ thereof was 0.31 mg.

Comparative Example 10

In accordance with Examples in Japanese Patent Laid-open No. 1987-260717, P25 (Nippon Aerosil Co., Ltd., purity: 99.5%, specific surface area: 50.8 m$^2$/g) was used as titanium dioxide to obtain a photocatalyst 26. The sodium content of the photocatalyst 26 could not be detected. Meanwhile, the silicon content of the photocatalyst 26 was 2.2 weight %, and the specific surface area was 38.7 m$^2$/g. Accordingly, the amount of silicon loaded into the photocatalyst 26 per a surface area 1 m$^2$ thereof was 0.56 mg.

Comparative Example 11

In accordance with Examples as described in Japanese Patent Laid-open No. 2004-161592, the composition ratio of titanium to silicon was to be 85:15 (Ti:Si) to obtain a photocatalyst 27. The sodium content of the photocatalyst 27 was 22 ppm, the silicon content was 2.9 weight %, and the specific surface area was 164.9 m$^2$/g. Accordingly, the amount of silicon loaded into the photocatalyst 27 per a surface area 1 m$^2$ thereof was 0.17 mg.

Comparative Example 12

The photocatalyst 27 was subjected to a calcination treatment at 600 degree centigrade for 3 hours to obtain a photocatalyst 28. The sodium content of the photocatalyst 28 was 25 ppm, the silicon content was 3.0 weight %, and the specific surface area was 76.0 m$^2$/g. Accordingly, the amount of silicon loaded into the photocatalyst 28 per a surface area 1 m$^2$ thereof was 0.39 mg.

Comparative Example 13

To a glass flask were added 250 g of water and 0.05 g of an aqueous solution of 0.1N sodium hydroxide. 24.5 g of titanium dioxide (ST-01, Ishihara Sangyo Kaisha, Ltd., adsorptive water content: 9 weight %, specific surface area: 300 m$^2$/g) was dispersed therein to give an A solution. To a beaker were added 100 g of water and 10.7 g of an aqueous solution of sodium silicate (SiO$_2$ content: 36.1 weight %, Na$_2$O content: 17.7 weight %, JIS K1408 "Water glass No. 1"), and the resulting material was stirred to give a B solution. The A solution was maintained at 35 degree centigrade and stirred. Thereto was added dropwise the B solution at a rate of 2 ml/min. to obtain a mixed solution C. The pH of the mixed solution C at this time was 11.5. While the mixed solution C was maintained at 35 degree centigrade, it was continuously stirred for 3 days. Then, the mixed solution C was filtered under a reduced pressure. The obtained filter medium was re-dispersed in 500 ml of water and filtered under a reduced pressure repeatedly four times for washing and then allowed to stand at room temperature for 2 days. The obtained solid content was pulverized by using a mortar and then subjected to a calcination treatment at 600 degree centigrade for 3 hours to obtain a photocatalyst 29. The sodium content of the photocatalyst 29 was 14,000 ppm, the silicon content was 3.4 weight %, and the specific surface area was 126.1 m$^2$/g. Accordingly, the amount of silicon loaded into the photocatalyst 29 per a surface area 1 m$^2$ thereof was 0.27 mg.

Comparative Example 14

To a glass flask was introduced 100 g of water. 10.0 g of titanium dioxide (P-25, Nippon Aerosil Co., Ltd., purity: 99.5%, specific surface area by BET method specific surface area measuring instrument: 50.8 m$^2$/g) was dispersed therein to give an A solution. An aqueous solution of 4N sodium hydroxide was added dropwise thereto so that the pH was adjusted to 10.5. While the resulting solution was heated up to 75 degree centigrade of the liquid temperature and maintained at 75 degree centigrade, 14.8 g of an aqueous solution of sodium silicate (SiO$_2$ content: 29.1 weight %, Na$_2$O content: 9.5 weight %, JIS K1408 "Water glass No. 3") was added thereto and stirred to give a B solution. While the B solution was heated up to 90 degree centigrade and maintained at 90 degree centigrade, an aqueous solution of 1N sulfuric acid was added dropwise thereto at a rate of 2 ml/min. to give a C solution. With the dropwise addition of the aqueous solution of sulfuric acid, the pH of the mixed solution was slowly decreased to lower value from 10.5 and the final pH of the C solution became 5. Then, while the C solution was maintained at 90 degree centigrade, it was continuously stirred for 1 hour and aged. Next, the aged C solution was filtered under a reduced pressure. The obtained filter medium was re-dispersed in 250 ml of water and filtered under a reduced pressure repeatedly four times for washing, and then dried at 120 degree centigrade for 3 hours. The obtained solid content was pulverized by using a mortar and then subjected to a calcination treatment at 600 degree centigrade for 3 hours to obtain a photocatalyst 30. The sodium content of the photocatalyst 30 was 2,500 ppm, the silicon content was 13.0 weight %, and the specific surface area was 68.4 $m^2/g$. Accordingly, the amount of silicon loaded into the photocatalyst 30 per a surface area 1 $m^2$ thereof was 1.90 mg.

Comparative Example 15

To a glass flask was introduced 100 g of water. 4.2 g of titanium dioxide (ST-01, Ishihara Sangyo Kaisha, Ltd., adsorptive water content: 9 weight %, specific surface area by BET method specific surface area measuring instrument: 300 $m^2/g$) was dispersed therein to give an A solution. To a beaker were added 43 g of water and 5.6 g of an aqueous solution of sodium silicate ($SiO_2$ content: 29.1 weight %, $Na_2O$ content: 9.5 weight %, JIS K1408 "Water glass No. 3"), and the resulting material was stirred to give a B solution. Then, the A solution was maintained at 35 degree centigrade and stirred. Thereto was added dropwise the B solution at a rate of 2 ml/min. At this time, an aqueous solution of 1N nitric acid was added dropwise thereto in an appropriate amount such that the pH of the mixed solution was from 6 to 8. The pH of the mixed solution was 7.0 when the dropwise addition of the B solution was completed. Then, while the mixed solution was maintained at 35 degree centigrade, it was continuously stirred for 16 hours and aged. Next, the mixed solution was filtered under a reduced pressure. The obtained filter medium was re-dispersed in 250 ml of water and filtered under a reduced pressure repeatedly four times for washing, and then dried at 120 degree centigrade for 3 hours. The obtained solid content was pulverized by using a mortar and then subjected to a calcination treatment at 600 degree centigrade for 3 hours to obtain a photocatalyst 31. The sodium content of the photocatalyst 31 was 5,900 ppm, the silicon content was 12.0 weight %, and the specific surface area was 258.3 $m^2/g$. Accordingly, the amount of silicon loaded into the photocatalyst 31 per a surface area 1 $m^2$ thereof was 0.47 mg.

Comparative Example 16

A photocatalyst 32 was obtained in the same manner as in Example 16, except that the pH of the mixed solution C was 2.6, the mixed solution C was neutralized with ammonia water before it was filtered under a reduced pressure for adjusting the pH to 6.8, and the resulting solid content was subjected to a calcination treatment at 1,000 degree centigrade instead of 600 degree centigrade. The sodium content of the photocatalyst 32 was 1,900 ppm, the silicon content was 6.5 weight %, and the specific surface area was 2.6 $m^2/g$. Accordingly, the amount of silicon loaded into the photocatalyst 32 per a surface area 1 $m^2$ thereof was 24.7 mg.

Comparative Example 17

A mixed solution C was prepared and continuously stirred for 3 days in the same manner as in Example 1, except that titanium dioxide was not used. As a result, the mixed solution C was colorless and transparent, and subjected to suction filtration using a membrane filter and as a result, the solid content was not obtained at all.

Evaluation of Photocatalysts 1 to 32 in Examples 1 to 16, Comparative Examples 1 to 16

(1. Evaluation of Methylene Blue Photodegradation Activity)

The photocatalysts 1 to 32 in Examples 1 to 16 and Comparative Examples 1 to 16 were suspended in each an aqueous methylene blue solution. Thereafter, the resulting solution was irradiated with light and the concentration of methylene blue in the solution was quantitatively analyzed by spectrometry, whereby the photodegradation activity was tested. The test operation method in detail is as follows.

(Preparation of Photocatalyst Suspension)

45 g of an aqueous methylene blue solution having a concentration of $40 \times 10^{-6}$ mol/L was weighed and introduced into a 100-cc polyethylene jar with a Teflon (registered trademark) stir bar previously arranged thereinside. Then, the resulting material was stirred by using a magnetic stirrer and 10 mg of the photocatalyst was added thereto. The material was violently stirred for 5 minutes and then continuously stirred by adjusting the stirring strength such that the solution was not flown and splashed.

(Preliminary Adsorption Treatment)

For 60 minutes, starting from a moment when the addition of photocatalyst was finished, stirring was continued without irradiation with light. After 60 minutes passed, 3.0 cc of the suspension was collected to give a sample before irradiation with light.

(Photodegradation Treatment)

3.5 cc of the suspension subjected to the preliminary adsorption treatment was selected and introduced to a quartz standard spectroscopic cell (Tosoh Quartz Co., Ltd., outer size: 12.5×12.5×45 mm, optical path width: 10 mm, optical path length: 10 mm, volume: 4.5 cc) with a Teflon (registered trademark) stir bar previously arranged thereinside and the resulting material was stirred using a magnetic stirrer. Then, it was irradiated with light from external/transverse direction of the spectroscopic cell for 5 minutes. Irradiation with light was carried out by using a light source apparatus, SX-UI151XQ (Ushio Inc., 150 W, a xenon short-arc lamp) as a light source in a quartz filter vessel filled with pure water. The irradiated light intensity was 5.0 $mW/cm^2$ using an ultraviolet intensity meter, UVD-365 PD (Ushio Inc., test wavelength: 365 nm). After irradiation, the suspension in the spectroscopic cell was collected to give a sample after irradiation with light.

(Quantitative Analysis of Methylene Blue)

An all-plastic 10-cc syringe was equipped with a membrane filter (Toyo Roshi Kaisha, Ltd., DISMIC-13 HP). Sample suspensions before and after irradiation with light were respectively introduced thereto for removing the photocatalyst by extrusion using a piston. At that time, the first half amount of the filtrate was discarded, while the rest half amount of the filtrate was collected in a semi-micro type dispocell (made of polystyrene, optical path width: 4 mm, optical path length: 10 mm, volume: 1.5 cc) for analysis of visible light. Then, the absorbance in a wavelength of 680 nm was measured by using a UV-visible spectrometer (UV-2500, Shimadzu Corp.) for calculating the concentration of methylene blue.

The photodegradation activity was evaluated by a ratio of the concentration of methylene blue after irradiation with light to the concentration of methylene blue before irradiation with light. The removal rates of methylene blue as photodegradation activity were shown in Table 1. Furthermore, the adsorption rates of methylene blue were calculated from the concentration of methylene blue before irradiation with light on the basis of the concentration of introduced methylene blue (concentration of methylene blue before the photocatalyst was added) and also illustrated in Table 1.

(2. Determination of Existence of Pores Derived from Silicon Oxide Film by Measurement of Pore Size Distribution)

Nitrogen adsorption isotherms of photocatalysts 1 to 17, 20, 23 to 26 and 29 to 32 in the desorption process under liquid nitrogen (77K) were measured by using AUTOSORB (a product of Quantachrome Co., Ltd.).

As pre-treatment of each photocatalyst, vacuum degassing was carried out at 100 degree centigrade. Next, measurement results of each photocatalyst were interpreted by the BET method and log differential pore volume distribution curves were obtained.

Then, existence of pores derived from silicon oxide films in photocatalysts 1 to 16, 25, 26, 29 to 32 were determined. Specifically, log differential pore volume distribution curves of a photocatalyst used as a raw material and a photocatalyst prepared by using the aforementioned photocatalyst as a base (base catalyst) and coated with a silicon oxide film were compared for determining existence of pores derived form the silicon oxide film.

In the range of 20 to 500 Angstroms of the photocatalysts 1 to 16, 25, 26 and 29 to 32, existence of pores derived from the silicon oxide film was shown in Table 1.

TABLE 1

|  | Photocatalyst | Amount of silicon introduced to the base $(mg/m^2)$ | Amount of loaded silicon $(mg/m^2)$ | Sodium content (ppm) | Adsorption Rate (%) | Removal Rate (%) | Silicon oxide film-derived pore |
|---|---|---|---|---|---|---|---|
| Example 1 | 1 | 0.24 | 0.33 | 87 | 40.8 | 56.1 | No |
| Example 2 | 2 | 0.07 | 0.18 | 56 | 6.6 | 51.9 | No |
| Example 3 | 3 | 0.15 | 0.24 | 85 | 21.2 | 52.5 | No |
| Example 4 | 4 | 0.48 | 0.39 | 160 | 45.5 | 46.7 | No |
| Example 5 | 5 | 0.29 | 0.22 | 34 | 8.8 | 69.2 | No |
| Example 6 | 6 | 0.20 | 0.18 | 12 | 9.3 | 56.1 | No |
| Example 7 | 7 | 0.28 | 0.27 | 17 | 30.7 | 54.5 | No |
| Example 8 | 8 | 0.24 | 0.23 | 180 | 43.2 | 57.9 | No |
| Example 9 | 9 | 0.24 | 0.25 | 120 | 40.6 | 53.8 | No |
| Example 10 | 10 | 0.24 | 0.24 | 210 | 44.9 | 51.9 | No |
| Example 11 | 11 | 0.24 | 0.27 | 93 | 31.7 | 51.0 | No |
| Example 12 | 12 | 0.24 | 0.46 | 98 | 45.0 | 54.1 | No |
| Example 13 | 13 | 0.24 | 0.64 | 96 | 35.0 | 48.0 | No |
| Example 14 | 14 | 0.24 | 1.25 | 92 | 16.4 | 43.2 | No |
| Example 15 | 15 | 0.24 | 0.32 | 480 | 39.4 | 59.9 | No |
| Example 16 | 16 | 0.24 | 0.16 | 150 | 29.5 | 55.9 | No |
| Comparative Example 1 | 17 | — | 0.00 | 1400 | 0.5 | 11.8 | — |
| Comparative Example 2 | 18 | — | 0.00 | 1400 | 2.3 | 15.9 | — |
| Comparative Example 3 | 19 | — | 0.00 | 1400 | 3.3 | 2.1 | — |
| Comparative Example 4 | 20 | — | 0.00 | not detected | 0.5 | 45.0 | — |
| Comparative Example 5 | 21 | — | 0.00 | not detected | 1.2 | 46.0 | — |
| Comparative Example 6 | 22 | — | 0.00 | not detected | 1.1 | 4.8 | — |
| Comparative Example 7 | 23 | — | 0.00 | 28 | 0.0 | 5.0 | — |
| Comparative Example 8 | 24 | — | 0.00 | 46 | 0.0 | 6.3 | — |
| Comparative Example 9 | 25 | — | 0.31 | 1200 | 57.8 | 31.0 | No |
| Comparative Example 10 | 26 | — | 0.56 | not detected | 17.5 | 31.5 | No |
| Comparative Example 11 | 27 | — | 0.17 | 22 | 3.8 | 11.1 | — |
| Comparative Example 12 | 28 | — | 0.39 | 25 | 7 | 30.3 | — |
| Comparative Example 13 | 29 | 0.24 | 0.27 | 14000 | 47.1 | 36.2 | Yes |
| Comparative Example 14 | 30 | 3.99 | 1.90 | 2500 | 11.0 | 22.0 | Yes |
| Comparative Example 15 | 31 | 0.59 | 0.47 | 5900 | 56.8 | 38.7 | Yes |
| Comparative Example 16 | 32 | 0.24 | 24.7 | 1900 | 1.8 | 4.3 | No |

* "Amount of silicon introduced to the base" indicates a value obtained by dividing the weight (mg) of silicon atom contained in silicate (an aqueous solution of sodium silicate) in use by the whole surface area ($m^2$) of the base (carbon dioxide particles) in use.

FIG. 1 (A) to (D) illustrate each a log differential pore volume distribution curve (a solid line) of a photocatalyst having a silicon oxide film and a log differential pore volume distribution curve (a dotted line) of a photocatalyst without having a silicon oxide film corresponding to a base of the photocatalyst.

Figure 2:
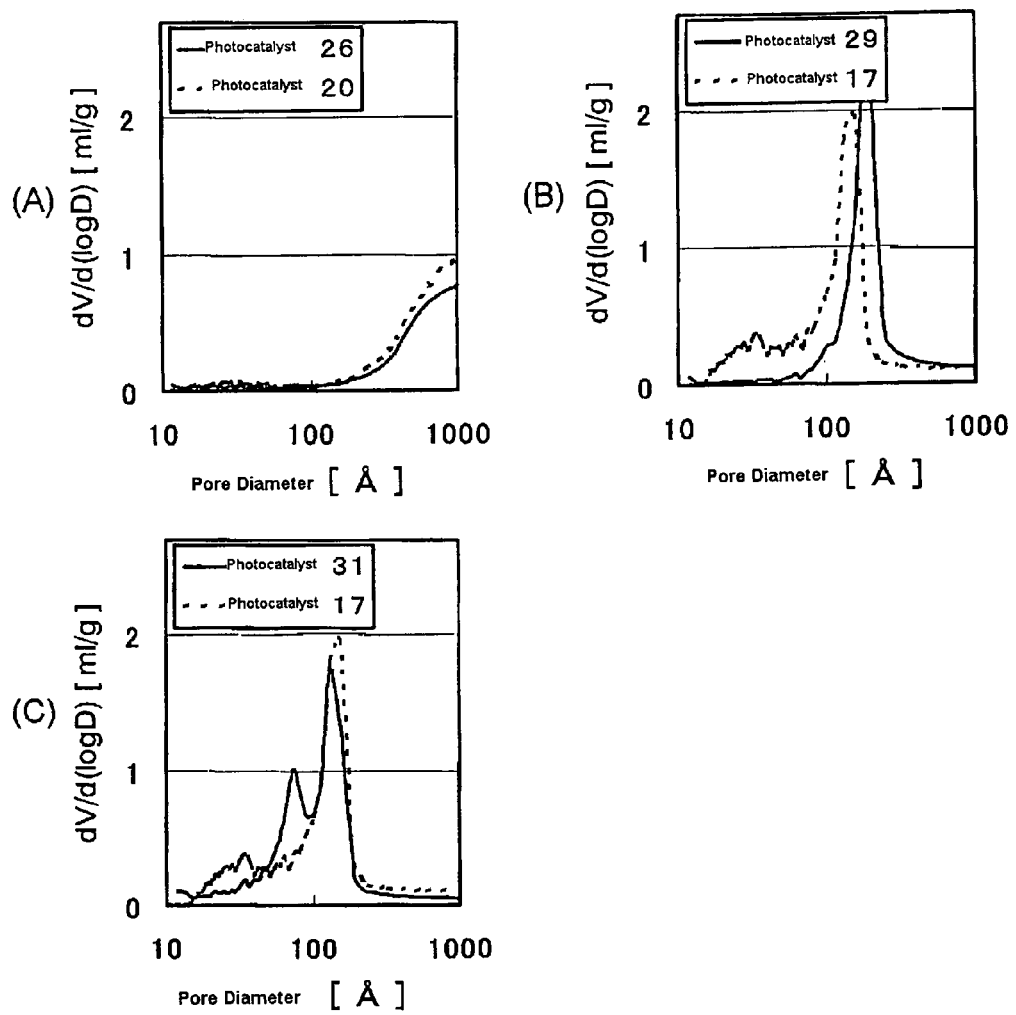
FIG. 2 (A) to (C) illustrate each a log differential pore volume distribution curve (a solid line) of a photocatalyst having a silicon oxide film and a log differential pore volume distribution curve (a dotted line) of a photocatalyst without having a silicon oxide film corresponding to a base of the photocatalyst.

Furthermore, FIG. 2 (A) to (C) illustrate each a log differential pore volume distribution curve (a solid line) of a photocatalyst having a silicon oxide film and a log differential pore volume distribution curve (a dotted line) of a photocatalyst without having a silicon oxide film corresponding to a base of the photocatalyst.

(3. Evaluation of Photodegradation Activity of Acetaldehyde)

The photocatalyst 1, 17 or 21 was fixed on a glass plate, and then irradiated with light in the presence of an acetaldehyde gas and the concentration of acetaldehyde in the gas was quantitatively analyzed by gas chromatography, whereby the photodegradation activity was tested. The test operation method in detail is as follows.

(Preparation of Photocatalyst Sample Plates)

5.0 g of the photocatalyst 1 was introduced to a 100-ml polyethylene jar. Thereinto were added 50.0 g of a glass bead having a diameter of 1 mm, 44.0 g of ethanol, 0.5 g of 1N hydrochloric acid and 0.5 g of a surfactant (Triton X-100, a registered trademark owned by Union Carbide Corporation), and the resulting material was tightly sealed. The sealed material was put in a stainless ball mill pot having an internal volume of 300 ml and the empty space was filled with clothes such that the jar was put in the center of the ball mill pot. Then, the ball mill pot was tightly sealed, and then put on the ball mill turning table for carrying out a dispersion treatment at a rate of 60 rpm for 18 hours. After the treatment, the jar was taken out and the glass bead was filtered out by using a nylon mesh sheet to obtain an ethanol liquid dispersion of the photocatalyst 1. Subsequently, dipping and pulling-up of the photocatalyst 1 in a slide glass (2.6 cm×7.6 cm, thickness: 1 mm) which was previously weighed in/from the ethanol liquid dispersion were carried out. Two-thirds of the slide glass was dipped at a rate of 0.4 cm per second every 90 seconds 12 times.

Thereafter, the slide glass was dried at room temperature. Then, one plane of the slide glass of 2.6 cm×7.6 cm (one surface of the slide glass) was excluded, while the photocatalyst 1 attached on the other plane was rubbed against by a glass plate and completely removed.

Further, the slide glass was subjected to a calcination treatment at 400 degree centigrade for 3 hours using an electric furnace in an air atmosphere to prepare a photocatalyst sample plate A.

The weights before and after fixation of the photocatalyst and the length of the photocatalyst 1-fixed portion were measured. As a result, the coat weight of the photocatalyst 1 was 6.1 mg, the coat area was 11.7 cm$^2$, and the coat weight per an area was 5.2 g/m$^2$.

A photocatalyst sample plate B was prepared in the same manner as described above, except that the photocatalyst 17 was used instead of the photocatalyst 1, and dipping and pulling-up were carried out one time. The weights before and after fixation of the photocatalyst and the length of the photocatalyst 17-fixed portion were measured. As a result, the coat weight of the photocatalyst 17 was 5.9 mg, the coat area was 11.8 cm$^2$, and the coat weight per an area was 5.0 g/m$^2$.

A photocatalyst sample plate C was prepared in the same manner as above, except that the photocatalyst 21 was used instead of the photocatalyst 1, and dipping and pulling-up were carried out three times. The weights before and after fixation of the photocatalyst and the length of the photocatalyst 21-fixed portion were measured. As a result, the coat weight of the photocatalyst 21 was 6.1 mg, the coat area was 12.5 cm$^2$, and the coat weight per an area was 4.9 g/m$^2$.

(Photodegradation Test of Acetaldehyde)

The photocatalyst sample plates A, B and C as prepared in the above (Preparation of Photocatalyst Sample Plates) were irradiated with ultraviolet rays of 5.4 mW/cm$^2$ in an air atmosphere for 3 hours. A black light blue lamp (Sankyo Denki Co., Ltd., FPL27BLB) of 27 W was used as a light source and UVA-365 (a product of Custom Co., Ltd.) was used for the measurement of UV intensity.

Three 1-liter Tedlar (a registered trademark owned by Du Pont Kabushiki Kaisha) bags equipped with one each of a silicon packing-attached connector and a mini cock were prepared. One side of the Tedlar (a registered trademark owned by Du Pont Kabushiki Kaisha) bag was cut open, photocatalyst sample plates A to C subjected to irradiation with ultraviolet rays before were put into each of the bags, and a 5 square-mm double-sided tape was attached to the center of the bag. Then, the resulting material was tightly sealed using a heat sealer. Subsequently, a vacuum pump was used for extracting air inside from the mini cock, and then the cock was closed and allowed to stand overnight in a dark room.

Then, a mixed gas of oxygen 20% and nitrogen 80% was mixed with a wet mixed gas dipped in an ion exchange water at 15 degree centigrade and a mixed gas of 1% acetaldehyde and nitrogen to prepare a gas of the acetaldehyde concentration of 101 ppm. 600 mL of the gas was collected and introduced into a bag containing the photocatalyst sample plate thereinside, and then the bag was allowed to stand in a dark room for 20 hours. Thereafter, the acetaldehyde concentration and the carbon dioxide concentration of the gas inside the bag were measured. Gas chromatography (Shimadzu Corp., GC-14) equipped with a metanizer was used for the measurement of the concentration. After analysis, the photocatalyst sample plate introduced to the bag was irradiated with light by using a fullwhite fluorescent lamp (a product of Matsushita Electric Works, Ltd., 10 W, FL10N) and the gas inside the bag was analyzed every two hours of the light irradiation. At this time, a plane to which the photocatalyst of the photocatalyst sample plate was fixed was distanced 4 cm from the fluorescent lamp. The ultraviolet intensity of a piece of film as a filter measured at the same place as the bag was 11 μm/cm$^2$.

Figure 3:
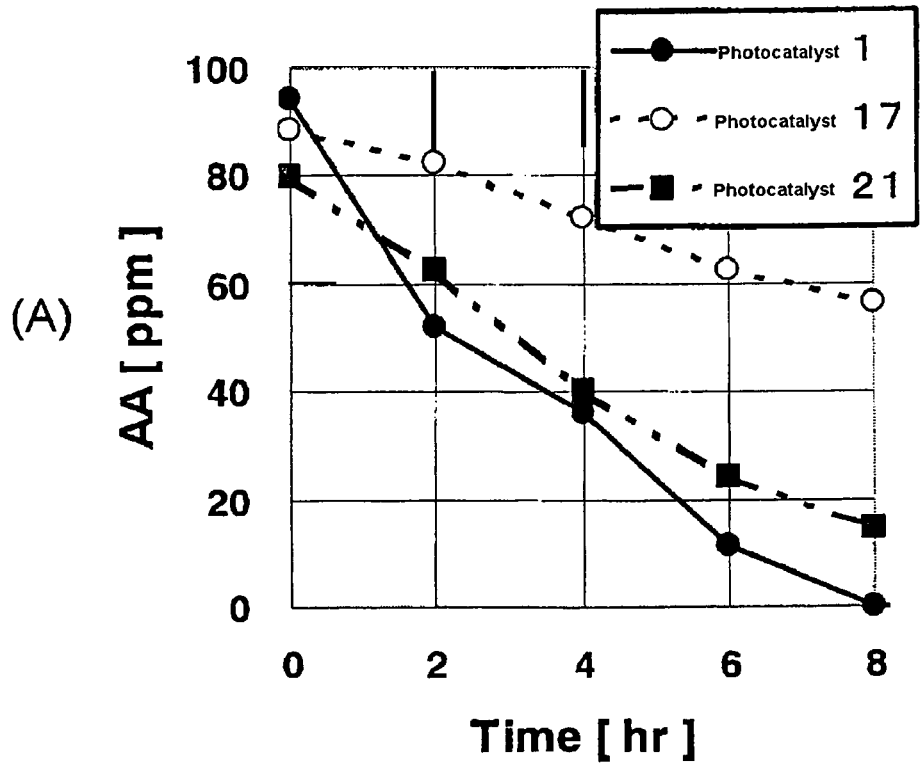
FIG. 3 (A) illustrates the time course of acetaldehyde concentration in a gas, while FIG. 3 (B) illustrates the time course of carbon dioxide concentration in a gas.
Figure 3:
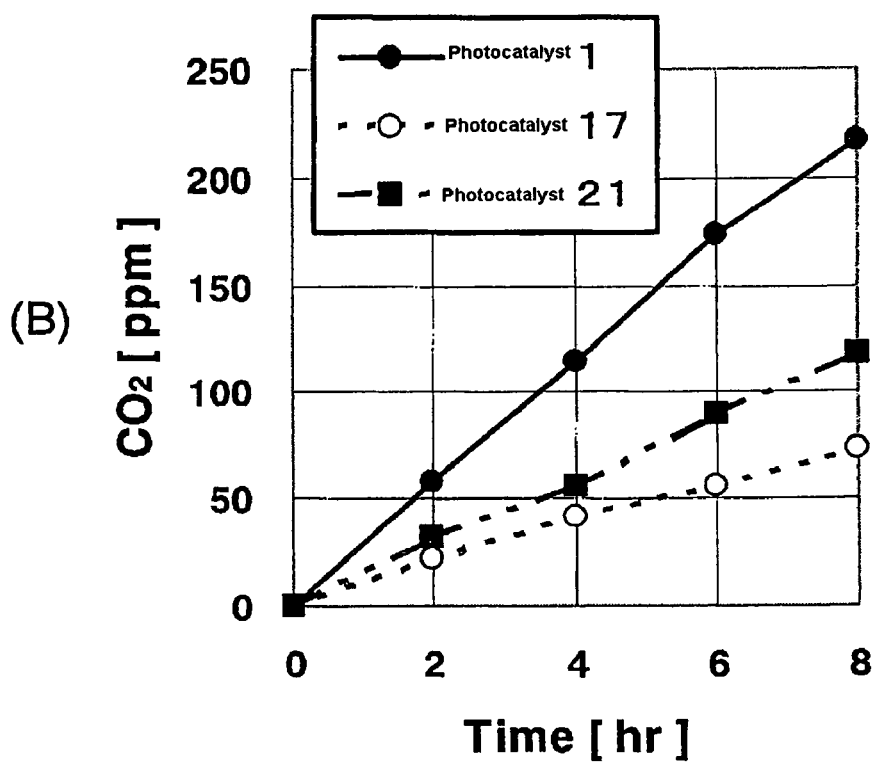

FIG. 3 (A) illustrates the time course of acetaldehyde concentration in the gas inside the bag. Meanwhile, FIG. 3 (B) illustrates the time course of carbon dioxide concentration in the gas inside the bag.

Example 17

In accordance with Example 1 in Japanese Patent No. 2938376, a yellow viscous liquid containing titanium was prepared. The pH of the prepared solution was 6.3.

This sol solution was partly collected, dried, solidified and subsequently calcined at 600 degree centigrade. From the weight measurement of the residue in the sol solution, it was found that the above yellow viscous liquid contained 2.1 weight % of titanium in terms of titanium dioxide.

Next, to a 100-mL polyethylene jar were introduced 50 g of a glass bead having a diameter of 1 mm, 14.7 g of the above yellow viscous liquid, 0.30 g of the photocatalyst 17 and 35.0 g of methanol, and the resulting material was tightly sealed. The sealed material was put in a stainless ball mill pot having an internal volume of 300 ml and the empty space was filled with clothes such that the jar was put in the center of the ball mill pot. Then, the ball mill pot was tightly sealed, and then put on the ball mill turning table for carrying out a dispersion treatment at a rate of 60 rpm for 18 hours. After the treatment, the jar was taken out and the glass bead was filtered out by using a nylon mesh sheet to obtain a light yellow liquid containing the photocatalyst 17.

Subsequently, in a state that methanol was interposed between two slide glasses (2.6 cm×7.6 cm, thickness: 1 mm) which were previously weighed, dipping and pulling-up in the light yellow liquid were carried out 20 times in total every 170 seconds. Herein, the dipping rate was 0.8 cm/sec, the pulling-up rate was 0.14 cm/sec, and the dipping length was 4.6 cm in 7.6 cm. After the treatment, two slide glasses were separated and attached substances on the surfaces in which methanol was interposed were wiped out.

Then, the resulting slide glasses were heated at 200 degree centigrade for 3 hours to prepare photocatalyst sample plates D and E. Coating films of the photocatalyst sample plates D and E had the intensity such that they were rubbed with fingers but not peeled off. Further, the film was formed on the surface, whereby the weights of two slide glasses were increased 1.1 mg and 1.0 mg respectively.

Next, 0.16 g of concentrated nitric acid was diluted with water to prepare 90.0 g of the total weight of an aqueous solution of nitric acid. Thereafter, a mixed solution of 1.0 g of an aqueous solution of sodium silicate ($SiO_2$ content: 29.1 weight %, $Na_2O$ content: 9.5 weight %, JIS K1408 "Water glass No. 3") and 9.0 g of water was prepared. 39.7 g of an aqueous solution of nitric acid was stirred and 0.3 g of the mixed solution was added dropwise thereto to prepare an acidic solution containing sodium silicate. The photocatalyst sample plate E was dipped in the acidic solution for 1 hour. It was washed by running water, and then subjected to a calcination treatment at 400 degree centigrade for 3 hours to prepare a photocatalyst sample plate F. A coating film of the photocatalyst sample plate F had the intensity such that it was rubbed with fingers but not peeled away. Further, the treatment did not cause a change in the weight, but the film was peeled off for analysis and as a result, 3 weight % of silicon oxide was contained, based on the film weight.

Evaluation of Example 17

(Evaluation of Photodegradation Activity of Methylene Blue of Photocatalyst Film Sample Plate)

The photodegradation activities of methylene blue of the photocatalyst sample plates D and F were evaluated in the following manner. First, from the photocatalyst sample plates D and F, test pieces of 0.8 cm×7.2 cm×1 mm were cut. Then, to the same quartz standard spectroscopic cell having a stir bar therein as that used in (1. Evaluation of Photodegradation Activity of Methylene Blue) of [Evaluation of Photocatalysts 1 to 32 in Examples 1 to 16 and Comparative Examples 1 to 16] was introduced 3 ml of an aqueous methylene blue solution of $40 \times 10^{-6}$ mol/L, and the above test pieces were fixed in a state that they were dipped 2.5 cm from one edge coated with a photocatalytic film. At this time, a plane opposite to a plane with the photocatalyst of the test piece fixed thereto was adhered to the inside of the quartz standard spectroscopic cell. The resulting material was stirred in a dark room for 1 hour and then a solution inside the spectroscopic cell was collected for quantitatively analyzing methylene blue using a spectrophotometer. Then, the solution was returned to the spectroscopic cell again and irradiated with light from external/transverse direction of the spectroscopic cell. The same irradiation apparatus as that used in (1. Evaluation of Photodegradation Activity of Methylene Blue) of [Evaluation of Photocatalysts 1 to 32 in Examples 1 to 16 and Comparative Examples 1 to 16] was used. After the irradiation for 30 minutes, the solution inside the spectroscopic cell was collected for quantitatively analyzing methylene blue in the same manner as before the irradiation. As a result, the decomposition ratios of methylene blue of the test pieces cut from the photocatalyst sample plates D and F were 15.3% and 29.1% respectively.

Example 18

In this Example, a photocatalyst liquid dispersion was prepared.

To a 200-ml glass jar were added 10.0 g of the photocatalyst 1 prepared according to the method as described in Example 1, 100 g of a zirconium oxide bead having a diameter of 3 mm, 85.0 g of water and 5.0 g of Poise 521 (a product of Kao Corporation, special carboxylic acid type polymer surfactant, solid content concentration: not less than 39% but not more than 41%) as a dispersion stabilizer. Then, the glass jar was tightly sealed and pulverized for 3 hours using a vibration mill machine (5400 double type, a product of Red Devil Company). After pulverization was completed, the bead is filtered out to obtain a photocatalyst liquid dispersion 1. Even if the photocatalyst liquid dispersion 1 was kept in a dark room for 30 days, the solid content was not precipitated so that there was no problem of dispersion stability.

Example 19

A photocatalyst liquid dispersion 2 was obtained in the same manner as in Example 18, except that the weight of water was 87.5 g and the weight of Poise 521 was 2.5 g. Even if the photocatalyst liquid dispersion 2 was kept in a dark room for 30 days, the solid content was not precipitated so that there was no problem of dispersion stability.

Example 20

A photocatalyst liquid dispersion 3 was obtained in the same manner as in Example 18, except that the weight of the photocatalyst 1 was 30.0 g, the weight of water was 55.0 g, and the weight of Poise 521 was 15.0 g. Even if the photocatalyst liquid dispersion 3 was kept in a dark room for 30 days, the solid content was not precipitated so that there was no problem of dispersion stability.

Example 21

A photocatalyst liquid dispersion 4 was obtained in the same manner as in Example 18, except that BYK-154 (a product of BYK Japan Kabushiki Kaisha, ammonium salt of an acrylic type copolymer, solid content concentration: 42%) was used in the amount of 5.0 g instead of Poise 521 as a dispersion stabilizer. Even if the photocatalyst liquid dispersion 4 was kept in a dark room for 30 days, the solid content was not precipitated so that there was no problem of dispersion stability.

Comparative Example 18

A photocatalyst liquid dispersion 5 was obtained in the same manner as in Example 18, except that a dispersion stabilizer was not used and the weight of water was 90.0 g. There was no dispersion stability in the photocatalyst liquid dispersion 5. When the photocatalyst liquid dispersion 5 was kept in a dark room even for 1 day, the solid content was completely precipitated.

Example 22

(Preparation of Photocatalyst Coating Composition 1)

In accordance with Example 1 in Japanese Patent No. 2938376, a yellow viscous liquid containing titanium (sol solution) was prepared. The pH of the prepared solution was 6.3. This sol solution was partly collected, dried, solidified and subsequently calcined at 600 degree centigrade. From the measurement of the residue weight in the calcined sol solution, it was found that the yellow viscous liquid contained 2.1 weight % of titanium in terms of titanium dioxide.

Next, to a 100-mL polyethylene jar were introduced 50 g of a glass bead having a diameter of 1 mm, 14.7 g of the above sol solution, 0.30 g of the photocatalyst 1 and 35.0 g of methanol, and the polyethylene jar was tightly sealed. The sealed jar was put in a stainless ball mill pot having an internal volume of 300 ml and the empty space was filled with clothes such that the jar was put in the center of the ball mill pot. Then, the ball mill pot was tightly sealed, and then put on the ball mill turning table for carrying out a dispersion treatment at a rate of 60 rpm for 18 hours. After the treatment, the jar was taken out and the glass bead was filtered out by using a nylon mesh sheet to obtain a photocatalyst coating composition 1.

The photocatalyst coating composition 1 was light yellow and muddy, and contained 0.6 weight % of the photocatalyst 1 and 0.6 weight % of titanium derived from the yellow viscous liquid in terms of titanium oxide. The concentration of the solid content was 1.2 weight % as a residue after the calcination at 600 degree centigrade.

(Coating of Photocatalyst Coating Composition 1 on Slide Glass)

Methanol was interposed between two slide glasses (2.6 cm×7.6 cm, thickness: 1 mm) which were previously weighed. Dipping and pulling-up of a pair of slide glasses were carried in/from the photocatalyst coating composition 1. Dipping and pulling-up were carried out 20 times in total every 170 seconds.

Herein, the dipping rate was 0.8 cm/sec, the pulling-up rate was 0.14 cm/sec, and the dipping length was 4.6 cm in 7.6 cm.

Thereafter, two slide glasses were separated and coating residues attached on the planes in which methanol was interposed were wiped out. Then, the slide glasses were heated at 200 degree centigrade for 3 hours to prepare a photocatalyst film sample plate 1. A coating film of the photocatalyst film sample plate 1 had the intensity such that it was rubbed with fingers but not peeled off. Further, the film was formed on the surface, whereby the weights of two slide glasses were increased 1.0 mg and 1.2 mg respectively.

(Evaluation of Photodegradation Activity of Acetaldehyde of Photocatalyst Film Sample Plate 1)

The photodegradation test of acetaldehyde of the photocatalyst film sample plate 1 was carried out. The photodegradation test method of acetaldehyde was the same as the photocomposition test method of acetaldehyde as described above. Furthermore, the initial concentration of acetaldehyde was 98 ppm, while the time for light irradiation was 24 hours. The residual concentration of acetaldehyde after 24 hours was 68 ppm. A coating containing the silicon oxide film coated photocatalyst according to the present invention was prepared. Even when a photocatalyst film was prepared using the prepared coating, it could be confirmed that the photodegradation activity was exhibited.

Example 23

A photocatalyst coating composition 2 was obtained in the same manner as in Example 22, except that water was used instead of methanol. The photocatalyst coating composition 2 was light yellow and muddy, and contained 0.6 weight % of the photocatalyst 1 and 0.6 weight % of titanium derived from the yellow viscous liquid in terms of titanium oxide. The concentration of the solid content was 1.2 weight % as a residue after the calcination at 600 degree centigrade.

(Coating of Photocatalyst Coating Composition 2 on Slide Glass)

A photocatalyst sample plate 2 was prepared in the same manner as in Example 22, except that water was interposed between slide glasses instead of methanol, the photocatalyst coating composition 2 was used instead of the photocatalyst coating composition 1, and dipping and pulling-up were carried out every 10 minutes. A coating film of the photocatalyst sample plate 2 had the intensity such that it was rubbed with fingers but not peeled off. Further, the film was formed on the surface, whereby the weights of two slide glasses were increased 1.5 mg and 1.3 mg respectively.

(Coating of Photocatalyst Coating Composition 2 on Silicon Wafer Surface)

A silicon wafer (2.6 cm×7.0 cm, thickness: 0.5 mm) was dipped in a resister stripper (a product of Kanto Chemical Co., Inc., SH-303). The wafer was subjected to washing with pure water, irradiation with ultrasonic wave while it was dipped in pure water and washing with pure water, and then spin-dried by rotating at a rate of 2,000 rpm in an air for washing the surface. The washed silicon wafer was horizontally placed and 0.50 ml of the photocatalyst coating composition 2 was added dropwise to a surface facing upward of 2.6 cm×7.0 cm. The silicon wafer was allowed to stand until it was dried. Thereafter, the silicon wafer was heated at 600 degree centigrade for 3 hours to prepare a photocatalyst film sample plate 3. A film of the photocatalyst film sample plate 3 had the intensity such that it was rubbed with fingers but not peeled off. Further, the film was formed on the surface, whereby the weight of the silicon wafer was increased 5.8 mg.

Example 24

To a 100-mL polyethylene jar with a stir bar arranged thereinside were introduced 6.0 g of the photocatalyst liquid dispersion 1 prepared in Example 18, 14.7 g of the yellow viscous liquid containing titanium (sol solution) prepared in the same manner as in Example 17 and 29.3 g of water. The polyethylene jar was stirred using a magnetic stirrer for 1 hour to obtain a photocatalyst coating composition 3. The photocatalyst coating composition 3 was light yellow and muddy, and contained 0.6 weight % of the photocatalyst, 0.6 weight % of titanium derived from the yellow viscous liquid in terms of titanium oxide and 0.3 weight % of the dispersing agent. The concentration of the solid content was 1.2 weight % as a residue after the calcination at 600 degree centigrade.

(Coating of Photocatalyst Coating Composition 3 on Slide Glass)

A photocatalyst film sample plate 4 was prepared in the same manner as in Example 22, except that the photocatalyst coating composition 3 was used instead of the photocatalyst coating composition 1. A coating film of the photocatalyst film sample plate 4 had the intensity such that it was rubbed with fingers but not peeled off. Further, the film was formed on the surface, whereby the weights of two slide glasses were increased 0.9 mg and 1.0 mg respectively.

The invention claimed is:

1. A photocatalyst comprising a photocatalytically active base, and a silicon oxide film covering the base, having no pores in the a silicon oxide film in the measurement of pore size distribution in the range of 20 to 500 Angstroms according to the nitrogen adsorption method, and calcined at not less than 400 degrees centigrade, wherein the alkali metal content of the photocatalyst is not less than 1 ppm but not more than 1,000 ppm.

2. The photocatalyst as set forth in claim 1, wherein the amount of silicon loaded into the photocatalyst per a surface area 1 m² thereof is not less than 0.10 mg but not more than 2.0 mg.

3. The photocatalyst as set forth in claim 1, wherein the alkali metal content of the photocatalyst is not less than 10 ppm but not more than 1,000 ppm.

4. The photocatalyst as set forth in claim 1, wherein said base is anatase type titanium oxide, rutile type titanium oxide or titanium oxide containing a mixture thereof.

5. The photocatalyst as set forth in claim 1, wherein said alkali metal is sodium and/or potassium.

6. The photocatalyst as set forth in claim 1, wherein said base is a particle.

7. The photocatalyst as set forth in claim 2, wherein said base is anatase type titanium oxide, rutile type titanium oxide or titanium oxide containing a mixture thereof.

8. The photocatalyst as set forth in claim 2, wherein said alkali metal is sodium and/or potassium.

9. The photocatalyst as set forth in claim 2, wherein said base is a particle.

10. The photocatalyst as set forth in claim 4, wherein said alkali metal is sodium and/or potassium.

11. The photocatalyst as set forth in claim 4, wherein said base is a particle.

12. The photocatalyst as set forth in claim 7, wherein said alkali metal is sodium and/or potassium.

13. The photocatalyst as set forth in claim 7, wherein said base is a particle.

14. The photocatalyst as set forth in claim 5, wherein said base is a particle.

15. The photocatalyst as set forth in claim 8, wherein said base is a particle.

16. The photocatalyst as set forth in claim 10, wherein said base is a particle.

17. The photocatalyst as set forth in claim 12, wherein said base is a particle.

18. A method for producing the photocatalyst as set forth in claim 1, including the following steps (A) to (C), in which the pH of the mixed solution containing both said base and silicate in step (A) is maintained at 5 or below:

(A) a step of mixing at least any one set of an aqueous medium containing said base and a silicate, an aqueous medium containing a silicate and said base, and an aqueous medium containing said base and an aqueous medium containing a silicate, and then covering said base with said silicon oxide film;

(B) a step of separating said silicon oxide film and said photocatalyst having the base covered with the silicon oxide film from said aqueous medium; and (C) a step of calcining said photocatalyst separated from said aqueous medium at not less than 400 degrees centigrade and then gaining said photocatalyst having no pores derived from a silicon oxide film in the measurement of pore size distribution in the range of 20 to 500 Angstroms according to the nitrogen adsorption method, and the alkali metal content of which is not less than 1 ppm but not more than 1,000 ppm.

19. The method for producing a photocatalyst as set forth in claim 18, in step (C), after drying said photocatalyst separated from said aqueous medium, said photocatalyst is calcined.

20. The method for producing a photocatalyst as set forth in claim 18, in which the alkali metal content of said photocatalyst is not less than 10 ppm but not more than 1,000 ppm.

21. The method for producing a photocatalyst as set forth in claim 18, in which said step (C) is a step of calcining said photocatalyst at not more than 1,200 degrees centigrade.

22. The method for producing a photocatalyst as set forth in claim 19, in which said step (C) is a step of calcining said photocatalyst at not more than 1,200 degrees centigrade.

23. The method for producing a photocatalyst as set forth in claim 18, in which said base is anatase type titanium oxide, rutile type titanium oxide or titanium oxide containing a mixture thereof.

24. The method for producing a photocatalyst as set forth in claim 18, in which said silicate is a salt of sodium and/or potassium.

25. The method for producing a photocatalyst as set forth in claim 23, in which said silicate is a salt of sodium and/or potassium.

26. A photocatalyst liquid dispersion comprising the photocatalyst as set forth in claim 1, a liquid medium and a dispersion stabilizer.

27. The photocatalyst liquid dispersion as set forth in claim 26, wherein said liquid medium is water.

28. The photocatalyst liquid dispersion as set forth in claim 26, wherein said dispersion stabilizer is an ionic surfactant.

29. A photocatalyst coating composition comprising the photocatalyst as set forth in claim 1, a liquid medium and a binder.

30. The photocatalyst coating composition as set forth in claim 29, containing a compound of titanium or silicon as said binder.

31. The photocatalyst coating composition as set forth in claim 30, wherein said compound containing titanium contains titanium peroxide.

32. The photocatalyst coating composition as set forth in claim 29, containing water and/or alcohol as said liquid medium.

* * * * *